(12) United States Patent
Janssen et al.

(10) Patent No.: US 7,947,184 B2
(45) Date of Patent: *May 24, 2011

(54) TREATMENT CHAMBER FOR SEPARATING COMPOUNDS FROM AQUEOUS EFFLUENT

(75) Inventors: Robert Allen Janssen, Alpharetta, GA (US); John Glen Ahles, Neenah, WI (US); Thomas David Ehlert, Neenah, WI (US); John Gavin MacDonald, Decatur, GA (US); Earl C. McCraw, Jr., Duluth, GA (US); Patrick Sean McNichols, Hortonville, WI (US); Paul Warren Rasmussen, Neenah, WI (US); Steve Roffers, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 984 days.

This patent is subject to a terminal disclaimer.

(21) Appl. No.: 11/777,151

(22) Filed: Jul. 12, 2007

(65) Prior Publication Data
US 2009/0014393 A1 Jan. 15, 2009

(51) Int. Cl.
*C02F 1/46* (2006.01)
*C02F 1/36* (2006.01)

(52) U.S. Cl. .... 210/748.01; 422/22; 422/20; 422/186.1; 422/186.03

(58) Field of Classification Search .......... 210/748.01–748.02; 427/600, 427/565; 422/20, 22, 24, 186, 186.1, 186.3, 422/186.4
See application file for complete search history.

(56) References Cited

U.S. PATENT DOCUMENTS

| | | |
|---|---|---|
| 2,115,056 A | 4/1938 | Samuel |
| 2,307,206 A | 1/1943 | Fischer |
| 2,584,053 A | 1/1952 | Seavey et al. |
| 2,661,192 A | 12/1953 | Horsley et al. |
| 2,946,981 A | 7/1960 | O'Neill |
| 3,066,232 A | 11/1962 | Branson |
| 3,202,281 A | 8/1965 | Weston |
| 3,246,881 A | 4/1966 | Davidson et al. |
| 3,249,453 A | 5/1966 | Schnoring et al. |
| 3,273,631 A | 9/1966 | Neuman |
| 3,275,787 A | 9/1966 | Newberry |
| 3,278,165 A | 10/1966 | Gaffney |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,479,873 A | 11/1969 | Hermanns |
| 3,490,584 A | 1/1970 | Balamuth |

(Continued)

FOREIGN PATENT DOCUMENTS
CA 2175065 5/1995
(Continued)

OTHER PUBLICATIONS
U.S. Appl. No. 11/777,140, filed Jul. 12, 2007.
(Continued)

*Primary Examiner* — Walter D Griffin
*Assistant Examiner* — Cameron J Allen
(74) *Attorney, Agent, or Firm* — Armstrong Teasdale LLP

(57) ABSTRACT

Processes of using treatment chambers for separating compounds in an aqueous effluent are disclosed. More particularly, the treatment chambers use ultrasonic energy and an electrode potential to provide efficient and effective removal of compounds from aqueous effluents, such as textile effluents.

20 Claims, 9 Drawing Sheets

U.S. PATENT DOCUMENTS

| | | |
|---|---|---|
| 3,502,763 A | 3/1970 | Hartman |
| 3,519,251 A | 7/1970 | Hammitt et al. |
| 3,542,345 A | 11/1970 | Kuris |
| 3,542,615 A | 11/1970 | Dobo et al. |
| 3,567,185 A | 3/1971 | Ross et al. |
| 3,664,191 A | 5/1972 | Hermanns |
| 3,692,618 A | 9/1972 | Dorschner et al. |
| 3,782,547 A | 1/1974 | Dietert |
| 3,802,817 A | 4/1974 | Matsuki et al. |
| 3,865,350 A | 2/1975 | Burtis |
| 3,873,071 A | 3/1975 | Tatebe |
| 4,035,151 A | 7/1977 | Czerny et al. |
| 4,062,768 A | 12/1977 | Elliot |
| 4,168,295 A | 9/1979 | Sawyer |
| 4,218,221 A | 8/1980 | Cottell |
| 4,249,986 A | 2/1981 | Obeda |
| 4,259,021 A | 3/1981 | Goudy, Jr. |
| 4,260,389 A | 4/1981 | Lister |
| 4,266,879 A | 5/1981 | McFall |
| 4,340,563 A | 7/1982 | Appel et al. |
| 4,372,296 A | 2/1983 | Fahim |
| 4,425,718 A | 1/1984 | Kawaguchi |
| 4,511,254 A | 4/1985 | North et al. |
| 4,556,467 A | 12/1985 | Kuhn |
| 4,612,016 A | 9/1986 | Jaeger et al. |
| 4,663,220 A | 5/1987 | Wisneski et al. |
| 4,673,512 A | 6/1987 | Schram |
| 4,693,879 A | 9/1987 | Yoshimura et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,375,926 A | 12/1994 | Omasa |
| 5,391,000 A | 2/1995 | Taniguchi |
| 5,466,722 A | 11/1995 | Stoffer et al. |
| 5,536,921 A | 7/1996 | Hedrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,831,166 A | 11/1998 | Kozuka et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,424 A | 4/2000 | Gipson et al. |
| 6,055,859 A | 5/2000 | Kozuka et al. |
| 6,060,416 A | 5/2000 | Kobata et al. |
| 6,074,466 A | 6/2000 | Iwasa |
| 6,090,731 A | 7/2000 | Pike et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III |
| 6,582,611 B1 | 6/2003 | Kerfoot |
| 6,593,436 B2 | 7/2003 | Austin et al. |
| 6,605,252 B2 | 8/2003 | Omasa |
| 6,624,100 B1 | 9/2003 | Pike et al. |
| 6,627,265 B2 | 9/2003 | Kutilek |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Hortel et al. |
| 6,739,524 B2 | 5/2004 | Taylor-McCune et al. |
| 6,770,600 B1 | 8/2004 | Lamola |
| 6,817,541 B2 | 11/2004 | Sands et al. |
| 6,818,128 B2 | 11/2004 | Minter |
| 6,837,445 B1 | 1/2005 | Tsai |
| 6,841,921 B2 | 1/2005 | Stegelmann |
| 6,858,181 B2 | 2/2005 | Aoyagi |
| 6,878,288 B2 | 4/2005 | Scott |
| 6,883,724 B2 | 4/2005 | Adiga et al. |
| 6,890,593 B2 | 5/2005 | Tian |
| 6,897,628 B2 | 5/2005 | Gunnerman |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock |
| 7,018,546 B2 | 3/2006 | Kurihara et al. |
| 7,083,322 B2 | 8/2006 | Moore et al. |
| 7,083,764 B2 | 8/2006 | Scott |
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,516,664 B2 | 4/2009 | Meier et al. |
| 7,582,156 B2 | 9/2009 | Tanaka et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,785,674 B2 * | 8/2010 | Janssen et al. ................ 427/600 |
| 2001/0040935 A1 | 11/2001 | Case |
| 2002/0036173 A1 | 3/2002 | Feke et al. |
| 2002/0164274 A1 | 11/2002 | Haggett et al. |
| 2003/0048692 A1 | 3/2003 | Cohen et al. |
| 2003/0066899 A1 | 4/2003 | Gipson |
| 2003/0116014 A1 | 6/2003 | Possanza et al. |
| 2003/0143110 A1 | 7/2003 | Kritzler |
| 2003/0194692 A1 | 10/2003 | Purdum |
| 2004/0022695 A1 | 2/2004 | Simon |

| | | | |
|---|---|---|---|
| 2004/0065599 A1 | 4/2004 | Lal et al. | |
| 2004/0120904 A1 | 6/2004 | Lye et al. | |
| 2004/0142041 A1 | 7/2004 | MacDonald et al. | |
| 2004/0187524 A1 | 9/2004 | Sen et al. | |
| 2004/0202728 A1 | 10/2004 | Shanker et al. | |
| 2005/0000914 A1 | 1/2005 | Dahlberg et al. | |
| 2005/0008560 A1 | 1/2005 | Kataoka et al. | |
| 2005/0017599 A1 | 1/2005 | Puskas | |
| 2005/0025797 A1 | 2/2005 | Wang | |
| 2005/0082234 A1 | 4/2005 | Solenthaler | |
| 2005/0084438 A1 | 4/2005 | Do et al. | |
| 2005/0084464 A1 | 4/2005 | McGrath et al. | |
| 2005/0085144 A1 | 4/2005 | MacDonald et al. | |
| 2005/0092931 A1 | 5/2005 | Gadgil et al. | |
| 2005/0129161 A1 | 6/2005 | Laberge | |
| 2005/0207431 A1 | 9/2005 | Beca et al. | |
| 2005/0235740 A1 | 10/2005 | Schram | |
| 2005/0260106 A1 | 11/2005 | Marhasin | |
| 2006/0000034 A1 | 1/2006 | McGrath | |
| 2006/0008442 A1 | 1/2006 | MacDonald et al. | |
| 2006/0120212 A1 | 6/2006 | Taniguchi et al. | |
| 2007/0114306 A1 | 5/2007 | Kawakami et al. | |
| 2007/0119785 A1 | 5/2007 | Englehardt et al. | |
| 2007/0131034 A1 | 6/2007 | Ehlert et al. | |
| 2007/0170277 A1 | 7/2007 | Ehlert | |
| 2008/0061000 A1 | 3/2008 | Janssen et al. | |
| 2008/0062811 A1 | 3/2008 | Janssen et al. | |
| 2008/0063718 A1 | 3/2008 | Janssen et al. | |
| 2008/0067418 A1 | 3/2008 | Ross | |
| 2008/0069887 A1 | 3/2008 | Baran et al. | |
| 2008/0117711 A1 | 5/2008 | Omasa | |
| 2008/0155763 A1 | 7/2008 | Janssen et al. | |
| 2008/0159063 A1 | 7/2008 | Janssen et al. | |
| 2008/0192568 A1 | 8/2008 | Hielscher et al. | |
| 2008/8251375 | 10/2008 | Hielscher et al. | |
| 2009/0014377 A1 | 1/2009 | Janssen et al. | |
| 2009/0147905 A1 | 6/2009 | Janssen et al. | |
| 2009/0155091 A1 | 6/2009 | Ehlert et al. | |
| 2009/0158936 A1 | 6/2009 | Janssen et al. | |
| 2009/0162258 A1 | 6/2009 | Janssen et al. | |
| 2009/0165654 A1 | 7/2009 | Koenig et al. | |
| 2009/0166177 A1 | 7/2009 | Wenzel et al. | |
| 2009/0168590 A1 | 7/2009 | Koenig et al. | |
| 2009/0168591 A1 | 7/2009 | Wenzel et al. | |
| 2009/0262597 A1 | 10/2009 | Kieffer et al. | |

FOREIGN PATENT DOCUMENTS

| | | | |
|---|---|---|---|
| CH | 657067 | | 8/1986 |
| CN | 1247628 | | 3/2006 |
| CN | 101153138 | | 4/2008 |
| DE | 262553 | A3 | 12/1988 |
| DE | 9017338 | | 3/1991 |
| DE | 4444525 | | 6/1996 |
| DE | 19854013 | | 5/2000 |
| DE | 19913397 | A1 | 9/2000 |
| DE | 19938254 | | 2/2001 |
| DE | 19938254 | A1 | 2/2001 |
| DE | 29825063 | | 6/2004 |
| DE | 102004040233 | | 3/2006 |
| DE | 102005025118 | | 1/2007 |
| DE | 102005034629 | | 1/2007 |
| EP | 0269941 | A1 | 6/1988 |
| EP | 0292470 | | 11/1988 |
| EP | 347891 | | 12/1989 |
| EP | 0457187 | A2 | 11/1991 |
| EP | 0459967 | | 12/1991 |
| EP | 0625482 | A | 11/1994 |
| EP | 648531 | | 4/1995 |
| EP | 0894612 | A2 | 2/1999 |
| EP | 1954388 | | 3/2007 |
| EP | 0983968 | | 3/2008 |
| EP | 2173669 | A2 | 4/2010 |
| EP | 2176173 | A2 | 4/2010 |
| FR | 2793811 | | 11/2000 |
| GB | 1404575 | | 9/1975 |
| JP | 56028221 | | 3/1981 |
| JP | 57119853 | | 7/1982 |
| JP | 5834051 | | 2/1983 |
| JP | 62039839 | U | 3/1987 |
| JP | 6372364 | | 4/1988 |
| JP | 63104664 | | 5/1988 |
| JP | 1108081 | | 4/1989 |
| JP | 2025602 | | 1/1990 |
| JP | 02281185 | A | 11/1990 |
| JP | 03053195 | A | 3/1991 |
| JP | 3086258 | | 4/1991 |
| JP | 03-157129 | A | 5/1991 |
| JP | 6228824 | | 8/1994 |
| JP | 8304388 | | 11/1996 |
| JP | 9286943 | | 11/1997 |
| JP | 10060331 | | 3/1998 |
| JP | 1113361 | | 5/1999 |
| JP | 2000158364 | | 12/1999 |
| JP | 2001017970 | | 1/2001 |
| JP | 2001252588 | | 9/2001 |
| JP | 2003103152 | A | 4/2003 |
| JP | 2004020176 | | 1/2004 |
| JP | 2004256783 | | 9/2004 |
| JP | 2005118688 | | 5/2005 |
| KR | 20020073778 | A | 9/2002 |
| KR | 1020050013858 | A | 2/2005 |
| KR | 1020050113356 | A | 12/2005 |
| WO | 9400757 | | 1/1994 |
| WO | 9420833 | | 9/1994 |
| WO | 9429873 | A | 12/1994 |
| WO | 9600318 | | 1/1996 |
| WO | 9609112 | A1 | 3/1996 |
| WO | 9743026 | | 11/1997 |
| WO | 9817373 | | 4/1998 |
| WO | 9844058 | | 10/1998 |
| WO | 99/33520 | | 7/1999 |
| WO | 0004978 | | 2/2000 |
| WO | 0041794 | | 7/2000 |
| WO | 0139200 | A | 5/2001 |
| WO | 0222252 | | 3/2002 |
| WO | 0250511 | | 6/2002 |
| WO | 0280668 | A2 | 10/2002 |
| WO | 03012800 | | 2/2003 |
| WO | 03102737 | | 12/2003 |
| WO | 2004026452 | | 4/2004 |
| WO | 2004064487 | | 8/2004 |
| WO | 2006037591 | | 4/2006 |
| WO | 2006043970 | A2 | 4/2006 |
| WO | 2006073645 | A1 | 7/2006 |
| WO | 2006074921 | | 7/2006 |
| WO | 2006/093804 | A | 9/2006 |
| WO | 2007011520 | A2 | 1/2007 |
| WO | 2005/011804 | | 5/2007 |
| WO | 2007060245 | A1 | 5/2007 |
| WO | 2007095871 | | 8/2007 |
| WO | 2008029379 | | 3/2008 |
| WO | 2008047259 | | 4/2008 |
| WO | 2008085806 | | 7/2008 |

OTHER PUBLICATIONS

U.S. Appl. No. 11/777,145, filed Jul. 12, 2007.
Non-final office action regarding U.S. Appl. No. 11/530,311, dated Nov. 5, 2008.
International Search Report and Written Opinion regarding PCT/IB2008/052760, dated Feb. 17, 2009.
International Search Report and Written Opinion, PCT/IB2008/055051 (Feb. 20, 2009).
International Search Report and Written Opinion regarding PCT/IB2007/052947, dated Mar. 12, 2008.
International Search Report and Written Opinion for PCT/IB2008/052764 mailed Apr. 2, 2009.
International Search Report and Written Opinion from PCT/IB2008/052766, dated Mar. 31, 2009.
International Search Report and Written Opinion regarding PCT/IB2007/052945, dated Feb. 1, 2008.
Non-final office action regarding U.S. Appl. No. 11/617,515, dated Mar. 27, 2009.
Non-final office action regarding U.S. Appl. No. 11/950,943, dated May 1, 2009.
J.D. Lawson, "Some Criteria for a Power Producing Thermonuclear Reactor", Proc. Phys. Soc. B70, pp. 6-10 (1957).

L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
Brenner et al, Single-bubble sonoluminescence, Reviews of Modern Physics, vol. 74, Apr. 2002, pp. 425-484.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
International Search Report and Written Opinion regarding PCT/IB2007/054892 dated May 15, 2008.
International Search Report and Written Opinion regarding PCT/IB2007/054898 dated May 15, 2008.
Non-final Office action regarding U.S. Appl. No. 11/530,183, dated Apr. 19, 2010.
Final Office Action Regarding U.S. Appl. No. 11/530,311, dated Jun. 23, 2009.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
Non-final office action regarding U.S. Appl. No. 11/617,497, dated Jun. 26, 2009.
International Search Report and Written Opinion regarding PCT/IB2008/055396, dated Jul. 29, 2009.
Non-final Office action regarding U.S. Appl. No. 11/963,237, dated Jul. 8, 2010.
Non-final Office action issued in related U.S. Appl. No. 11/777,140 on Aug. 9, 2010.
Non-Final Office action issued in related U.S. Appl. No. 11/966,418 on Aug. 2, 2010.
Non-Final Office action issued in related U.S. Appl. No. 11/966,447 on Aug. 2, 2010.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
International Search Report and Written Opinion regarding PCT/IB2008/055514, dated Aug. 25, 2009.
International Search Report and Written Opinion regarding PCT/IB2008/055395, dated Sep. 14, 2009.
International Search Report and Written Opinion regarding PCT/IB2008/055394, dated Sep. 28, 2009.
Blume, T. and Neis, U. "Improved wastewater disinfection by ultrasonic pre-treatment." Ultrasonics Sonochemistry, 2004, No. 11, pp. 333-336.
European Office Action regarding European Application No. 07805228.9, dated Oct. 9, 2009.
Non-final Office Action regarding U.S. Appl. No. 12/335,231, dated Oct. 15, 2009.
Oct. 27, 2010 Letter regarding the Office action issued for Mexican Patent Application Serial No. MX/a/2009/002519 mailed Oct. 12, 2010.
U.S. Appl. No. 11/530,210, filed Sep. 8, 2006.
U.S. Appl. No. 11/530,311, filed Jan. 26, 2007.
International Search Report and Written Opinion regarding PCT/IB2007/052988, 4 pages, dated Feb. 14, 2008.
Taleyarkhan, et al., "Evidence for Nuclear Emissions During Acoustic Cavitation," Science, (Mar. 8, 2002), vol. 295, pp. 1868-1873.
Kloeppel, James E., "Temperature inside collapsing bubble four times that of sun," News Bureau, University of Illinois at Urbana-Champaign.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion," viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al., "Additional Evidence of Nuclear Emissions During Acoustic Cavitation," Physcial Review E, (Mar. 2004). vol. 69.
"Thermonuclear Fusion Energy Source for Future Generations," viewed at http://www.crppwww.epfl.ch/crppfusion/ on Oct. 23, 2007.
Peplow, Mark, "Desktop fusion is back on the table," viewed at http://nature.com/news/2006/060109/full/060109-5.html on May 4, 2007.
Lahey, Taleyarkhan, and Nigmatulin, "Bubble Power," IEEE spectrum, May 2005, pp. 39-43.
U.S. Appl. No. 11/963,237, filed Dec. 21, 2007.
U.S. Appl. No. 11/617,497, filed Dec. 28, 2006.
U.S. Appl. No. 11/617,515, filed Dec. 28, 2006.
U.S. Appl. No. 11/963,139, filed Dec. 21, 2007.
U.S. Appl. No. 11/966,458, filed Dec. 28, 2007.
U.S. Appl. No. 11/966,472, filed Dec. 28, 2007.
U.S. Appl. No. 11/966,418, filed Dec. 28, 2007.
U.S. Appl. No. 11/966,447, filed Dec. 28, 2007.
U.S. Appl. No. 11/965,435, filed Dec. 27, 2007.
Non-final Office action regarding U.S. Appl. No. 11/965,435, dated Mar. 11, 2010.
English translation of Nagel WO 2006/074921 A1, accessed on the EPO website.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
Non-final Office action issued in related U.S. Appl. No. 11/530,210 on Jun. 28, 2010.
Non-final Office action issued in related U.S. Appl. No. 11/530,210 on Dec. 1, 2010.
Final Office action issued in related U.S. Appl. No. 11/777,140, Dec. 1, 2010.
Non-final Office Action submitted in U.S. Appl. No. 12/704,058 dated Dec. 9, 2010.
Non-final Office Action submitted in U.S. Appl. No. 11/530,183 dated Oct. 13, 2010.
Final Office action issued in U.S. Appl. No. 11/966,447 mailed Jan. 5, 2011.
Supplementary European Search Report issued in EP Application No. 08789242 mailed Dec. 17, 2010.
Non-final Office Action received in U.S. Appl. No. 11/966,458 mailed Sep. 28, 2010.
Non-final Office action issued in U.S Appl. No. 11/963,139, dated Feb. 18, 2011.
Non-final Office action issued in U.S. Appl. No. 11/777,140, dated Feb. 23, 2011.

* cited by examiner

TREATMENT CHAMBER FOR SEPARATING COMPOUNDS FROM AQUEOUS EFFLUENT

BACKGROUND OF DISCLOSURE

The present disclosure generally relates to treatment chambers for separating compounds in an aqueous solution. More particularly, the present disclosure relates to treatment chambers that use ultrasonic energy and an electrode potential to provide efficient and effective removal of compounds from aqueous effluents, such as textile effluents.

In nearly all textile dyeing and printing processes, some fraction of the applied colorant will not bind to the substrate. These unbound dyes and reactants are typically removed by a water rinsing process, generating large quantities of textile effluent that must be disposed in an environmentally acceptable manner.

Previous attempts have disposed of the textile effluent by passing the effluent through an ion exchange resin or activated carbon. During these reactions, such materials or resins adsorb the dyes and other soluble components in the textile effluent slowly and require large volumes of the adsorbent to perform effectively.

Other attempts have utilized continuous chemical reactors such as a plug flow reactor containing adsorbent beads or particles having specific surface functionalities, through which dyes and reactants found in textile effluents are adsorbed. Specifically, the beads or particles are packed into a column in the plug flow reactor and an aqueous solution of textile effluent is pumped through the column, thereby exposing the surface of the beads or particles to allow for adsorption of the dyes and reactants in the effluent to occur. These moieties can be adsorbed onto the surface and within the pores of the beads or particles.

One problem with processing textile effluent through a column such as that of a conventional plug flow reactor, is that many of the compounds to be adsorbed (e.g., dyes and reactants) must travel through a hydrodynamic boundary layer surrounding the bead or particle. This boundary layer is a source of resistance for the compounds, which prolongs the adsorption process and increases time and costs of the removal of unbound dyes and reactants from textile effluents.

One previous attempt to reduce adsorption time required to remove the compounds from textile effluents is by increasing flow rate of the processing stream in the plug flow reactor. This reduces the thickness of the hydrodynamic boundary layer, which enhances the rate at which the transport of compounds to the surface of the beads and particles can occur. This solution, however, results in less residence time in the plug flow reactor for the adsorption process to occur. Additionally, there is increased pressure drop across the reactor, and as such, larger plug flow reactor geometries and processing equipment are required.

Based on the foregoing, there is a need in the art for a treatment chamber that prevents a thick hydrodynamic boundary layer from forming, and thus, allows for quicker more efficient removal of compounds such as dyes and reactants from aqueous effluents.

SUMMARY OF THE DISCLOSURE

The present disclosure is directed to processes of removing compounds, such as dyes and reactants, from aqueous effluents using novel treatment chambers. The treatment chambers can be used to remove compounds from various aqueous effluents such as, for example, textile effluents, beverages, and bodies of water. Furthermore, compounds such as nitrogen, oxygen and the like in waste streams can also be removed using the processes of the present disclosure. Specifically, the treatment chambers used in the processes have a thinner hydrodynamic boundary layer as compared to conventional plug flow reactors allowing for a faster, more efficient removal of compounds. Generally, the treatment chambers comprise an elongate housing comprising an inlet end, an outlet end, and an ultrasonic waveguide assembly. In one embodiment, the ultrasonic waveguide assembly comprises an ultrasonic horn assembly comprising a horn member. The ultrasonic waveguide assembly is typically disposed entirely within the treatment chamber.

As such, the present disclosure is directed to a process for removing compounds from an aqueous effluent. The process comprises: introducing the aqueous effluent through at least one inlet port of an elongate housing of a treatment chamber, the housing comprising longitudinally opposite ends and an interior space, the housing further being generally closed at least one longitudinal end; ultrasonically energizing and electrically charging an outer surface of an elongate ultrasonic horn of an elongate ultrasonic waveguide assembly located within the housing at a predetermined ultrasonic frequency and electrode potential to remove compounds from the aqueous effluent; and exhausting the cleaned aqueous effluent from at least one outlet port of the housing.

The present disclosure is further directed to a process for removing compounds from an aqueous effluent. The process comprises: introducing the aqueous effluent through at least one inlet port of an elongate housing of a treatment chamber, the housing comprising longitudinally opposite ends and an interior space, the housing further being generally closed at least one longitudinal end; ultrasonically energizing and electrically charging an outer surface of a first elongate ultrasonic horn of a first elongate ultrasonic waveguide assembly located within the housing at a first predetermined ultrasonic frequency and an electrode potential and ultrasonically energizing and electrically charging an outer surface of a second elongate ultrasonic horn of a second elongate ultrasonic waveguide assembly located within the housing at a second predetermined ultrasonic frequency and the electrode potential to remove compounds from the aqueous effluent, wherein the first waveguide assembly and the second waveguide assembly are oriented in parallel within the housing; and exhausting the cleaned aqueous effluent from at least one outlet port of the housing.

The present disclosure is further directed to a process for removing compounds from an aqueous effluent. The process comprises: introducing the aqueous effluent through at least one inlet port of an elongate housing of a treatment chamber, the housing comprising longitudinally opposite ends and an interior space, the housing further being generally closed at least one longitudinal end; ultrasonically energizing and electrically charging an outer surface of a first elongate ultrasonic horn of a first elongate ultrasonic waveguide assembly located within the housing at a first predetermined ultrasonic frequency and an electrode potential and ultrasonically energizing and electrically charging an outer surface of a second elongate ultrasonic horn of a second elongate ultrasonic waveguide assembly located within the housing at a second predetermined ultrasonic frequency and the electrode potential to remove compounds from the aqueous effluent, wherein both the first waveguide assembly and the second waveguide assembly independently comprise terminal ends, wherein the terminal end of the first waveguide assembly faces towards the terminal end of the second waveguide assembly; and exhausting the cleaned aqueous effluent from at least one outlet port of the housing.

The present disclosure is further directed to a process for removing compounds from an aqueous effluent. The process comprises: introducing the aqueous effluent through at least one inlet port of an elongate housing of a treatment chamber, the housing comprising longitudinally opposite ends and an interior space, the housing further being generally closed at least one longitudinal end; ultrasonically energizing and electrically charging an outer surface of a first elongate ultrasonic horn of a first elongate ultrasonic waveguide assembly located within the housing at a first predetermined ultrasonic frequency and an electrode potential and ultrasonically energizing and electrically charging an outer surface of a second elongate ultrasonic horn of a second elongate ultrasonic waveguide assembly located within the housing at a second predetermined ultrasonic frequency and the electrode potential to remove compounds from the aqueous effluent, wherein both the first waveguide assembly and the second waveguide assembly independently comprise terminal ends, wherein the terminal end of the first waveguide assembly faces away from the terminal end of the second waveguide assembly; and exhausting the cleaned aqueous effluent from at least one outlet port of the housing.

Other features of the present disclosure will be in part apparent and in part pointed out hereinafter.

BRIEF DESCRIPTION OF THE FIGURES

Corresponding reference characters indicate corresponding parts throughout the drawings.

DETAILED DESCRIPTION OF THE PREFERRED EMBODIMENT

The present disclosure is generally directed to a treatment chamber for removing compounds from aqueous effluent. Specifically, in one embodiment, the treatment chamber is capable of removing compounds such as nitrogen, chlorine, and oxygen from waste water, such as through the process of electrolysis. For example, the treatment chamber is used in processes using both ultrasonics and electrolysis to degrade compounds such as water and ammonia into less complex components (e.g., oxygen, nitrogen, hydrogen, and the like). Additionally, the processes can be used in the reduction of metal ions to precipitate the metals out of solution (e.g., gold, copper, silver, and the like. In another embodiment, the treatment chamber removes dyes and reactants from textile effluent. In yet another embodiment, the treatment chamber removes microorganisms and other contaminants from drinking water.

Figure 1:
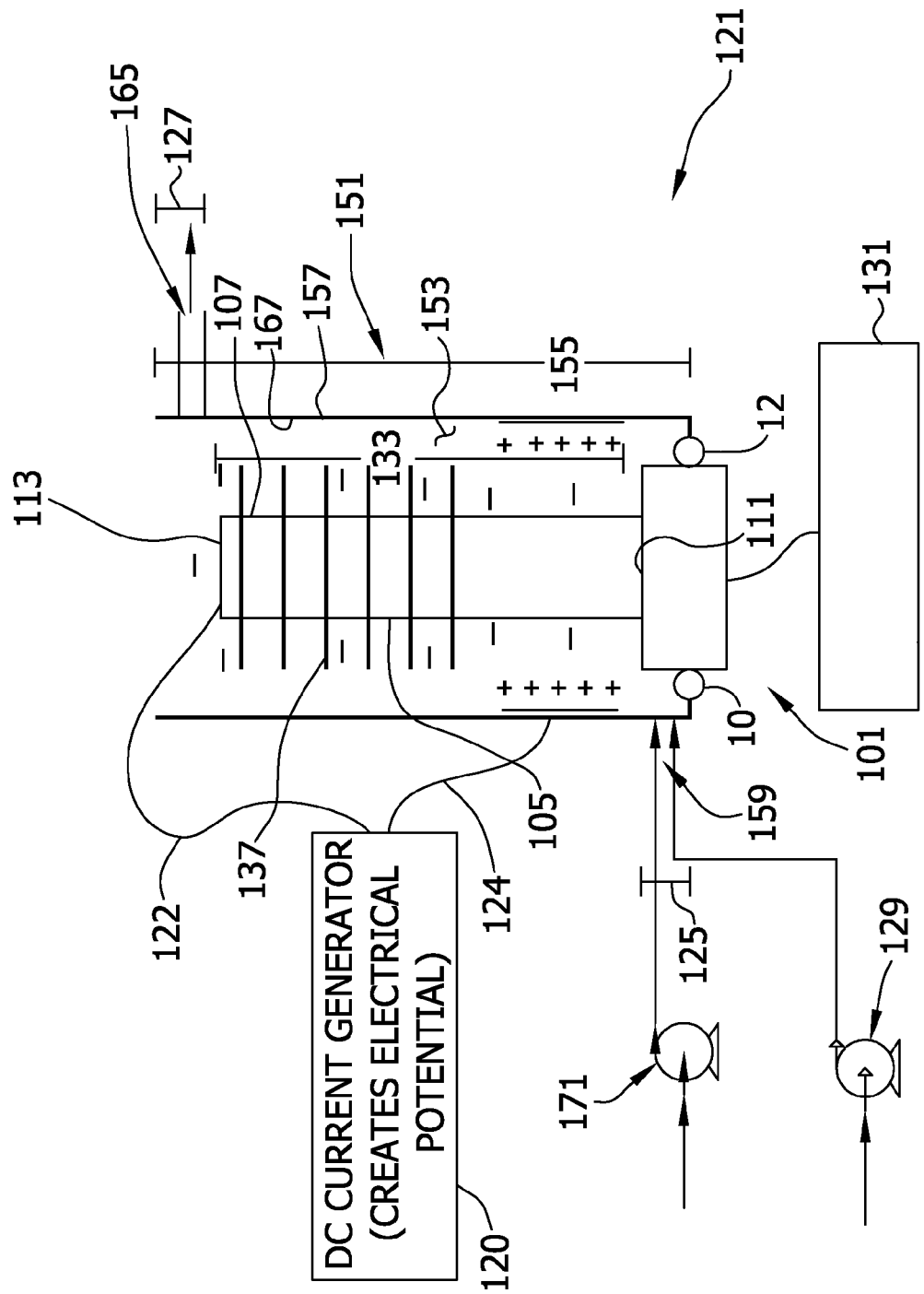
FIG. 1 is a schematic of a treatment chamber used in a process according to one embodiment of the present disclosure for ultrasonically treating and electrically charging an ultrasonic horn for removing compounds in an aqueous effluent.

FIG. 1 provides a treatment chamber, generally indicated at 121, for removing compounds from an aqueous effluent in accordance with the processes of the present disclosure. In particular, the treatment chamber 121 is suitable for use in liquid treatment systems using ultrasonic agitation of the liquid solution (in combination with the subjection of the solution to an electrode potential, as discussed more fully below) to remove compounds from an aqueous effluent. For example, in one specific application, as noted above, aqueous textile effluent is treated to kill, remove, and/or oxidize microorganisms (e.g., bacteria, viruses, spores, and the like) prior to being disposed. The treatment chamber of the present disclosure may accomplish this through the sparging of ozone gas into the chamber along with the addition of hydrogen peroxide. Additionally, the ultrasonic horn, as described below, operates in a cavitational mode to enhance the sonochemistries between the compounds within the waste water, the ozone gas, and hydrogen peroxide. As the treatment chamber of the present disclosure is further charged as an electrode-type system, the chamber can further induce the redox reaction to remove the compounds from the effluent. Other compounds to be removed from aqueous solutions (e.g., effluents) include, for example, bacteria, viruses, spores, nitrogen, halogen, oxygen, organic polymers, gold, silver, and copper.

As illustrated in FIG. 1, the treatment chamber 121 is generally elongate and has a general inlet end 125 (a lower end in the orientation of the illustrated embodiment) and a general outlet end 127 (an upper end in the orientation of the illustrated embodiment). The treatment chamber 121 is configured such that fluid (e.g., aqueous solutions/effluents containing compounds to be removed) enters the treatment chamber 121 generally at the inlet end 125 thereof, flows generally longitudinally within the chamber (e.g., upward in the orientation of the illustrated embodiment) and exits the chamber generally at the outlet end of the chamber.

The terms "upper" and "lower" are used herein in accordance with the vertical orientation of the treatment chamber 121 illustrated in the various drawings and are not intended to describe a necessary orientation of the chamber in use. That is, while the chamber 121 is most suitably oriented vertically, with the outlet end 127 of the chamber above the inlet end 125 as illustrated in the various drawings, it is understood that the chamber may be oriented with the inlet end above the outlet end, or it may be oriented other than in a vertical orientation (see FIGS. 4-6) and remain within the scope of this disclosure.

The terms "axial" and "longitudinal" refer directionally herein to the vertical direction of the chamber 121 (e.g., end-to-end such as the vertical direction in the illustrated embodiment of FIG. 1). The terms "transverse", "lateral" and "radial" refer herein to a direction normal to the axial (e.g., longitudinal) direction. The terms "inner" and "outer" are also used in reference to a direction transverse to the axial direction of the treatment chamber 121, with the term "inner" referring to a direction toward the interior of the chamber and the term "outer" referring to a direction toward the exterior of the chamber.

The inlet end 125 of the treatment chamber 121 is in fluid communication with a suitable intake system, generally indicated at 129, that is operable to direct one or more aqueous effluents to, and more suitably through, the chamber 121. Although not illustrated, it should be understood by one skilled in the art that the intake system 129 may comprise one or more pumps operable to pump the respective effluents from a corresponding source thereof to the inlet end 125 of the chamber 121 via suitable conduits (not shown).

It is understood that the intake system 129 may be configured to deliver more than one aqueous solution to the treatment chamber 121 without departing from the scope of this disclosure. It is also contemplated that intake systems other than that illustrated in FIG. 1 and described herein may be used to deliver one or more effluents to the inlet end 125 of the treatment chamber 121 without departing from the scope of this disclosure.

Furthermore, the inlet end 125 may be in fluid communication with an air sparge, generally indicated at 171, designed to force air into the interior of the housing. The air sparge 171 facilitates the flow of liquid (e.g., aqueous effluent) transversely inward toward the horn to thereby facilitate ultrasonic energization (i.e., agitation) of the liquid. Typically, the air is forced through a porous media so as to create small air bubbles. Desirably, the air sparged used in the treatment chamber has a gas diffuser porosity rated from medium to fine and a gas flow rate of from about 0.01 liters per minute to about 100 liters per minute, and, more suitably, from about 10 liters per minute to about 50 liters per minute. Furthermore, the air sparge forces air into the interior of the housing at a gas pressure of from about 0.2 psi to about 100 psi and, more suitably, from about 10 psi to about 50 psi, depending upon the desired gas flow rate and back pressure of the treatment system.

Figure 2A:
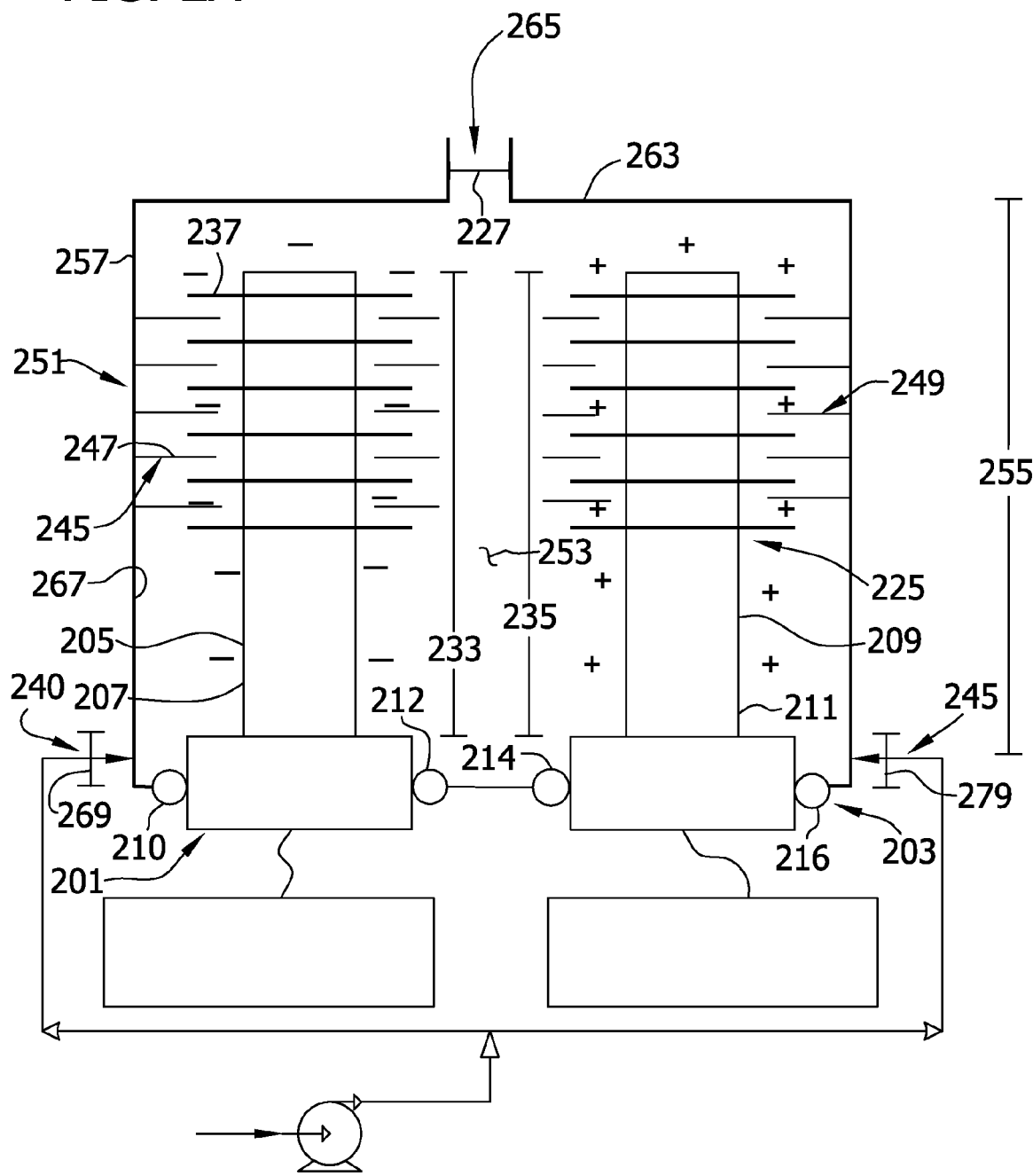
FIG. 2A is a schematic of a treatment chamber used in a process according to a second embodiment of the present disclosure for ultrasonically treating and electrically charging an ultrasonic horn for removing compounds in an aqueous effluent.

Still referring to FIG. 1, the treatment chamber 121 comprises a housing 151 defining an interior space 153 of the chamber through which liquid delivered to the chamber flows from the inlet end 125 to the outlet end 127 thereof. The housing 151 suitably comprises an elongate tube 155 generally defining, at least in part, a sidewall 157 of the chamber 121. The tube 155 may have one or more inlet ports (one such inlet port being illustrated in FIG. 1 and indicated at 159) formed therein through which one or more effluents to be treated within the chamber 121 are delivered to the interior space 153 thereof. It should be understood by one skilled in the art that the inlet end of the housing may include more than one port. For example, although not shown, the housing may comprise two inlet ports, wherein the first inlet port and the second inlet port are suitably in parallel, spaced relationship with each other. Furthermore, as illustrated in FIG. 2A, the housing may comprise two inlet ends 269 and 279. The two inlet ends 269, 279 may further independently include at least one inlet port (indicated generally at 235 and 245, respectively).

Moreover, in one suitable embodiment, the housing further comprises an inlet collar (not shown) that is connected to and mounted on one end of the tube to further define (along with the inlet port) the inlet end of the chamber. The inlet collar at the inlet end of the chamber is generally annular and has at least one, and more suitably a plurality of inlet ports formed therein for receiving aqueous effluents into the interior space of the chamber. At least one inlet port is oriented generally tangentially relative to the annular collar so that liquid flows into the interior space of the chamber generally tangentially thereto to impart a swirling action to liquid as it enters the chamber. More suitably, a pair of inlet ports is arranged in parallel alignment with each and extends generally tangentially relative to the annular collar, with one port being designated herein as the outer inlet port and the other port being designated the inner inlet port.

This dual tangential inlet port arrangement is particularly useful for initiating mixing of components within the effluent before the effluent is further subjected to ultrasonic treatment and electric charge within the chamber. This action, combined with the swirling action resulting from the tangential direction in which the aqueous effluent is directed into the chamber, facilitate an initial mixing of these components before the aqueous effluent flows further through the chamber for ultrasonic and electric treatment. If additional components are to be added to the mixture, such components may be delivered into the interior space of the chamber via the inlet port formed in the chamber sidewall. The collar may also have an additional tangential set of inlet ports and a pair of generally vertically oriented inlet ports. It is understood, however, that none of the ports need to be oriented tangentially relative to the collar to remain within the scope of this disclosure. It is also contemplated that the collar may be omitted altogether such that all components are delivered to the inlet port formed in the chamber sidewall.

With reference to FIG. 2A, in one embodiment, the housing 251 may comprise a closure 263 connected to and substantially closing the longitudinally opposite end of the sidewall 257, and having at least one outlet port 265 therein to generally define the outlet end 227 of the treatment chamber 221. The sidewall 257 (e.g., defined by the elongate tube 255) of the chamber 221 has an inner surface 267 that together with the waveguide assembly (or waveguide assemblies described further below, and generally indicated at 201 and 203) and the closure 263 define the interior space 253 of the chamber. In the illustrated embodiment, the tube 255 is generally cylindrical so that the chamber sidewall 257 is generally annular in cross-section. However, it is contemplated that the cross-section of the chamber sidewall 257 may be other than annular, such as polygonal or another suitable shape, and remains within the scope of this disclosure. The chamber sidewall 257 of the illustrated chamber 221 is suitably constructed of a transparent material, although it is understood that any suitable material may be used as long as the material is compatible with the liquid solutions being treated in the chamber, the pressure at which the chamber is intended to operate, and other environmental conditions within the chamber such as temperature.

Figure 4:
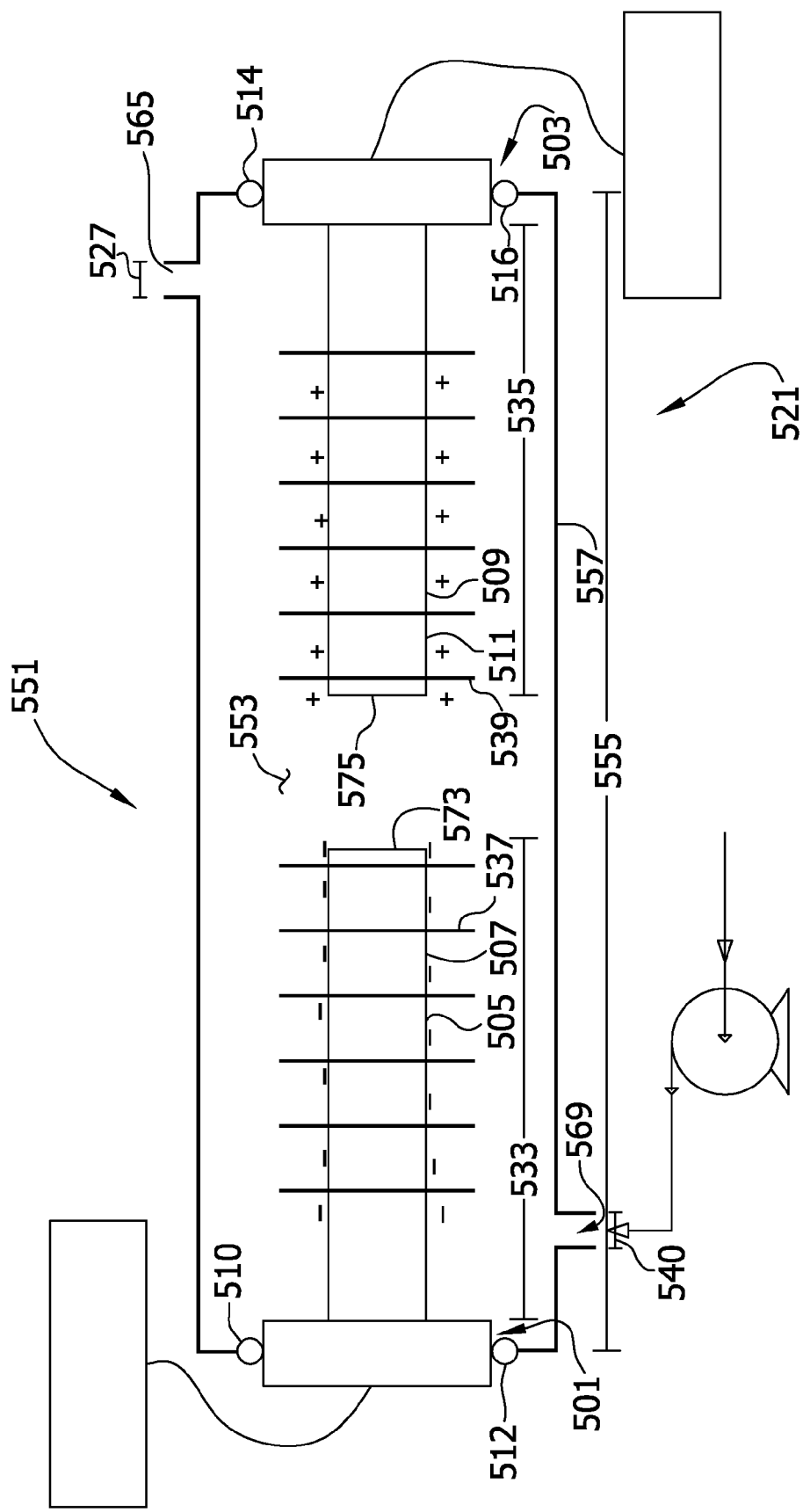
FIG. 4 is a schematic of a treatment chamber used in a process according to a fourth embodiment of the present disclosure for ultrasonically treating and electrically charging an ultrasonic horn for removing compounds in an aqueous effluent.
Figure 5:
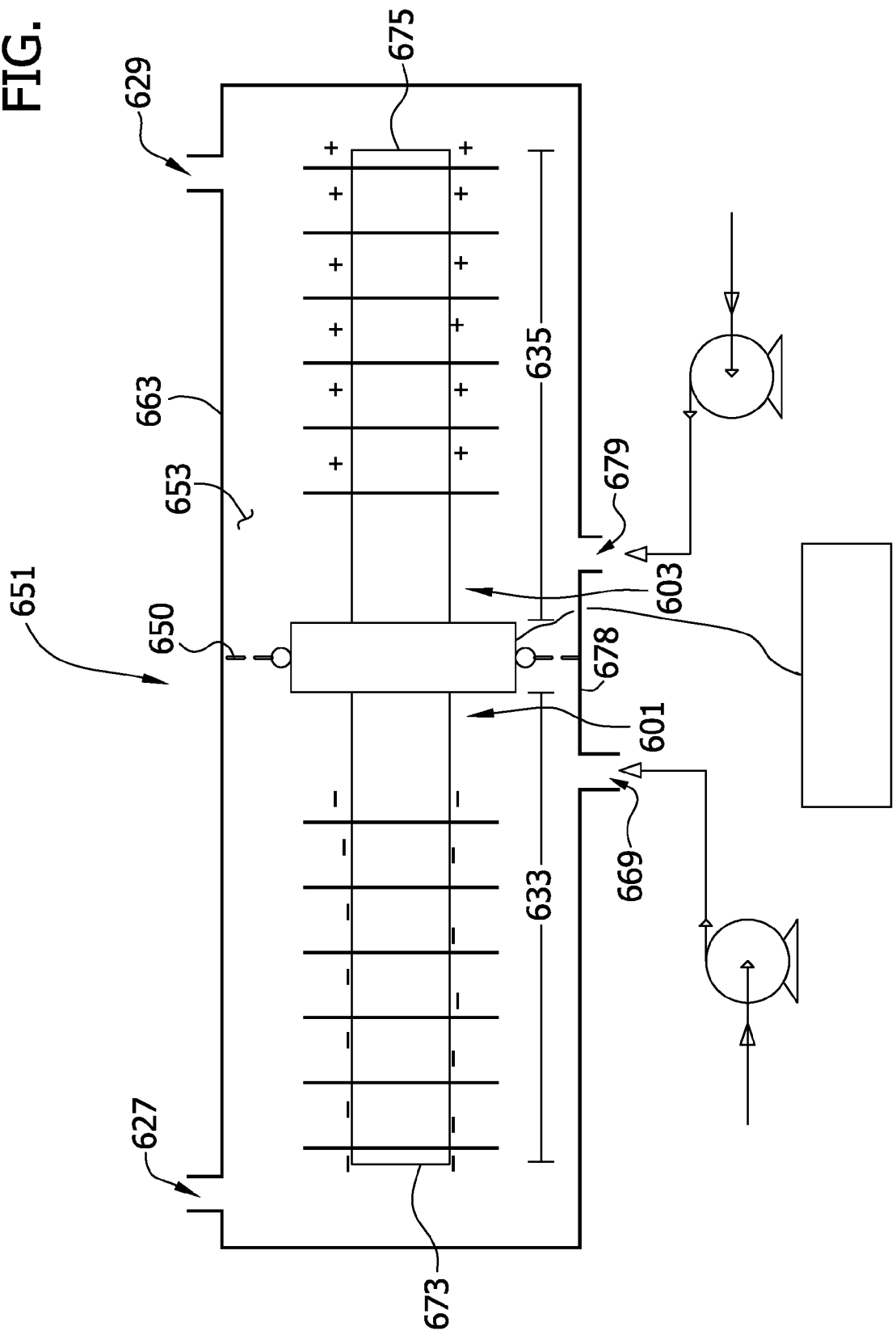
FIG. 5 is a schematic of a treatment chamber used in a process according to a fifth embodiment of the present disclosure for ultrasonically treating and electrically charging an ultrasonic horn for removing compounds in an aqueous effluent.
Figure 6:
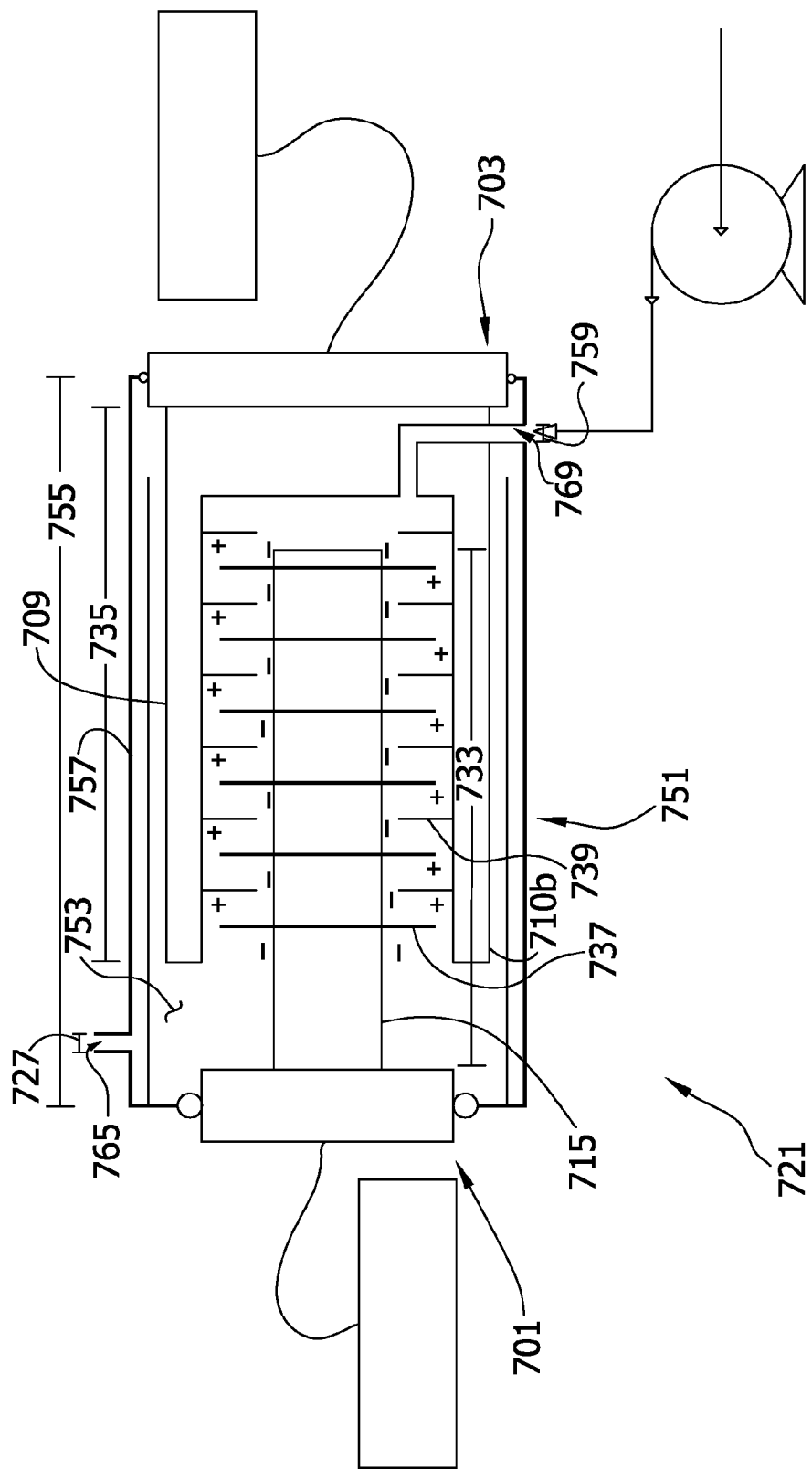
FIG. 6 is a schematic of a treatment chamber used in a process according to a sixth embodiment of the present disclosure for ultrasonically treating and electrically charging an ultrasonic horn for removing compounds in an aqueous effluent.

Now referring again to FIG. 1, a waveguide assembly, generally indicated at 101, extends longitudinally at least in part within the interior space 153 of the chamber 121 to ultrasonically energize liquid (and any other components of the aqueous effluent) flowing through the interior space 153 of the chamber 121. In particular, the waveguide assembly 101 of the illustrated embodiments extends longitudinally from the lower or inlet end 125 of the chamber 121 up into the interior space 153 thereof to a terminal end 113 of the waveguide assembly disposed intermediate the inlet port (e.g., inlet port 159 where it is present). Although illustrated in FIGS. 1 and 2A as extending longitudinally into the interior space 153 of the chamber 121, it should be understood by one skilled in the art, and more particularly, as illustrated in FIGS. 4-6, the waveguide assembly may extend laterally from a housing sidewall of the chamber, running horizontally through the interior space thereof. Typically, the waveguide assembly 101 is mounted, either directly or indirectly, to the chamber housing 151 as will be described later herein.

Still referring to FIG. 1, the waveguide assembly 101 suitably comprises an elongate horn assembly, generally indicated at 133, disposed entirely with the interior space 153 of the housing 151, intermediate the inlet port 159 and the outlet port 165 for complete submersion within the liquid being treated within the chamber 121, and more suitably, in the illustrated embodiment, it is aligned coaxially with the chamber sidewall 157. The horn assembly 133 has an outer surface 107 that together with the inner surface 167 of the sidewall 157 defines a flow path within the interior space 153 of the chamber 121 along which liquid and other components flow past the horn within the chamber (this portion of the flow path being broadly referred to herein as the ultrasonic treatment zone). The horn assembly 133 has an upper end defining a terminal end of the horn assembly (and therefore the terminal end 113 of the waveguide assembly) and a longitudinally opposite lower end 111. Although not shown, it is particularly preferable that the waveguide assembly 101 also comprises a booster coaxially aligned with and connected at an upper end thereof to the lower end 111 of the horn assembly 133. It is understood, however, that the waveguide assembly 101 may comprise only the horn assembly 133 and remain within the scope of this disclosure. It is also contemplated that the booster may be disposed entirely exterior of the chamber housing 151, with the horn assembly 133 mounted on the chamber housing 151 without departing from the scope of this disclosure.

The waveguide assembly 101, and more particularly the booster is suitably mounted on the chamber housing 151, e.g., on the tube 155 defining the chamber sidewall 157, at the upper end thereof by a mounting member (not shown) that is configured to vibrationally isolate the waveguide assembly (which vibrates ultrasonically during operation thereof) from the treatment chamber housing. That is, the mounting member inhibits the transfer of longitudinal and transverse mechanical vibration of the waveguide assembly 101 to the chamber housing 151 while maintaining the desired transverse position of the waveguide assembly (and in particular the horn assembly 133) within the interior space 153 of the chamber housing and allowing both longitudinal and transverse displacement of the horn assembly within the chamber housing. The mounting member also at least in part (e.g., along with the booster and/or lower end of the horn assembly) closes the inlet end 125 of the chamber 121. Examples of suitable mounting member configurations are illustrated and described in U.S. Pat. No. 6,676,003, the entire disclosure of which is incorporated herein by reference to the extent it is consistent herewith.

In one particularly suitable embodiment, the mounting member is of single piece construction. Even more suitably the mounting member may be formed integrally with the booster (and more broadly with the waveguide assembly 101). However, it is understood that the mounting member may be constructed separate from the waveguide assembly 101 and remain within the scope of this disclosure. It is also understood that one or more components of the mounting member may be separately constructed and suitably connected or otherwise assembled together.

In one suitable embodiment, the mounting member is further constructed to be generally rigid (e.g., resistant to static displacement under load) so as to hold the waveguide assembly 101 in proper alignment within the interior space 153 of the chamber 121. For example, the rigid mounting member in one embodiment may be constructed of a non-elastomeric material, more suitably metal, and even more suitably the same metal from which the booster (and more broadly the waveguide assembly 101) is constructed. The term "rigid" is not, however, intended to mean that the mounting member is incapable of dynamic flexing and/or bending in response to ultrasonic vibration of the waveguide assembly 101. In other embodiments, the rigid mounting member may be constructed of an elastomeric material that is sufficiently resistant to static displacement under load but is otherwise capable of dynamic flexing and/or bending in response to ultrasonic vibration of the waveguide assembly 101.

A suitable ultrasonic drive system 131 including at least an exciter (not shown) and a power source (not shown) is disposed exterior of the chamber 121 and operatively connected to the booster (not shown) (and more broadly to the waveguide assembly 101) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumberg, Ill.

In one embodiment, the drive system 131 is capable of operating the waveguide assembly 101 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

With particular reference to FIG. 1, the horn assembly 133 comprising an elongate, generally cylindrical horn 105 having an outer surface 107, and two or more (i.e., a plurality of) agitating members 137 connected to the horn and extending at least in part transversely outward from the outer surface of the horn in longitudinally spaced relationship with each other. The horn 105 is suitably sized to have a length equal to about one-half of the resonating wavelength (otherwise commonly referred to as one-half wavelength) of the horn. In one particular embodiment, the horn 105 is suitably configured to resonate in the ultrasonic frequency ranges recited previously, and most suitably at 20 kHz. For example, the horn 105 may be suitably constructed of a titanium alloy (e.g., Ti6Al4V) and sized to resonate at 20 kHz. The one-half wavelength horn 105 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the treatment chamber 121 may include a horn 105 sized to have any increment of one-half wavelength without departing from the scope of this disclosure.

Figure 7:
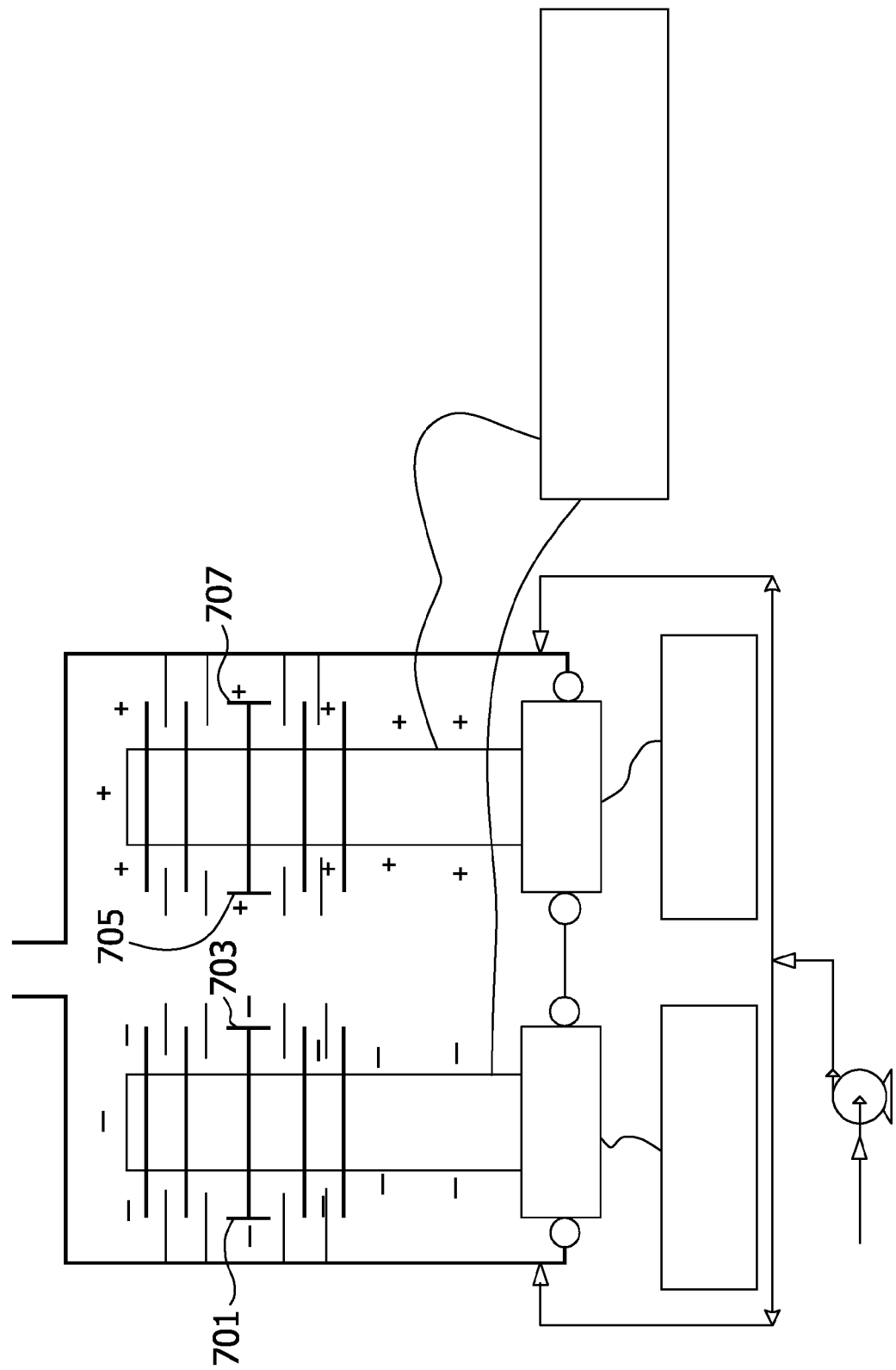
FIG. 7 is a schematic of a treatment chamber used in a process according to a seventh embodiment of the present disclosure for ultrasonically treating and electrically charging an ultrasonic horn for removing compounds in an aqueous effluent.

In the illustrated embodiment, the agitating members 137 comprise a series of six washer-shaped rings that extend continuously about the circumference of the horn 105 in longitudinally spaced relationship with each other and transversely (e.g., radially in the illustrated embodiment) outward from the outer surface of the horn. In this manner the vibrational displacement of each of the agitating members 137 relative to the horn 105 is relatively uniform about the circumference of the horn. It is understood, however, that the agitating members 137 need not each be continuous about the circumference of the horn 105. For example, the agitating members 137 may instead be in the form of spokes, blades, fins or other discrete structural members that extend transversely outward from the outer surface 107 of the horn 105. For example, as illustrated in FIG. 7, two of the six agitating members are in a T-shape 701, 703, 705, and 707. Specifically, the two agitating members surrounding the nodal region, as described more fully below, are in a T-shape. It has been found that members having the T-shape, generate a strong radial (e.g., horizontal) acoustic wave that further increases the cavitation effect as described more fully herein.

By way of a dimensional example, the horn assembly 133 of the illustrated embodiment of FIG. 1 has a length of about 5.25 inches (133.4 mm), one of the rings 137 is suitably disposed adjacent the terminal end 113 of the horn 105 (and hence of the waveguide assembly 101), and more suitably is longitudinally spaced approximately 0.063 inches (1.6 mm) from the terminal end of the horn 105. In other embodiments the uppermost ring 137 may be disposed at the terminal end of the horn 105 and remain within the scope of this disclosure. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than six without departing from the scope of this disclosure. It is also understood that the longitudinal spacing between the agitating members 137 may be other than as illustrated in FIG. 1 and described above (e.g., either closer or spaced further apart). Furthermore, while the rings 137 illustrated in FIG. 1 are equally longitudinally spaced from each other, it is alternatively contemplated that where more than two agitating members are present, the spacing between longitudinally consecutive agitating members need not be uniform to remain within the scope of this disclosure. Furthermore, as illustrated in FIGS. 4-6, when the waveguide assembly extends laterally within the interior space of the chamber, the agitating members may be laterally spaced from one another.

In particular, the locations of the agitating members 137 are at least in part a function of the intended vibratory displacement of the agitating members upon vibration of the horn assembly 133. For example, in the illustrated embodiment of FIG. 1, the horn assembly 133 has a nodal region located generally longitudinally centrally of the horn 105 (e.g., between the third and fourth rings). As used herein and more particularly shown in FIG. 1, the "nodal region" of the horn 105 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn assembly 133 suitably comprises transverse expansion of the horn but may also include transverse movement (e.g., bending) of the horn. Likewise, in FIGS. 4-6, in which the horn runs laterally within the interior space of the chamber housing, the "nodal region" refers to a lateral region or segment of the horn member along which little (or no) lateral displacement occurs during ultrasonic vibration of the horn and axial (e.g., longitudinal in the illustrated embodiment) displacement of the horn is generally maximized.

In the illustrated embodiment of FIG. 1, the configuration of the one-half wavelength horn 105 is such that the nodal region is particularly defined by a nodal plane (i.e., a plane transverse to the horn member at which no longitudinal displacement occurs while transverse displacement is generally maximized) is present. This plane is also sometimes referred to as a "nodal point". Accordingly, agitating members 137 (e.g., in the illustrated embodiment, the rings) that are disposed longitudinally further from the nodal region of the horn 105 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 105 may be configured so that the nodal region is other than centrally located longitudinally on the horn member without departing from the scope of this disclosure. It is also understood that one or more of the agitating members 137 may be longitudinally located on the horn so as to experience both longitudinal and transverse displacement relative to the horn upon ultrasonic vibration of the horn 105.

Still referring to FIG. 1, the agitating members 137 are sufficiently constructed (e.g., in material and/or dimension such as thickness and transverse length, which is the distance that the agitating member extends transversely outward from the outer surface 107 of the horn 105) to facilitate dynamic motion, and in particular dynamic flexing/bending of the agitating members in response to the ultrasonic vibration of the horn. In one particularly suitable embodiment, for a given ultrasonic frequency at which the waveguide assembly 101 is to be operated in the treatment chamber (otherwise referred to herein as the predetermined frequency of the waveguide assembly) and a particular liquid to be treated within the chamber 121, the agitating members 137 and horn 105 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the liquid being treated at the predetermined ultrasonic frequency. For example, where the liquid flowing within the chamber comprises an aqueous effluent, and more particularly water, and the ultrasonic frequency at which the waveguide assembly 101 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members. It is understood that the waveguide assembly 101 may be configured differently (e.g., in material, size, etc.) to achieve a desired cavitation mode associated with the particular liquid being treated. For example, as the viscosity of the liquid being treated changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this disclosure.

In one suitable embodiment, a ratio of the transverse length of at least one and more suitably all of the agitating members to the thickness of the agitating member is in the range of about 2:1 to about 6:1. As another example, the rings each extend transversely outward from the outer surface 107 of the horn 105 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members may be other than that of the rings as described above without departing from the scope of this disclosure. Also, while the agitating members 137 (rings) may suitably each have the same transverse length and thickness, it is understood that the agitating members may have different thicknesses and/or transverse lengths.

In the above described embodiment, the transverse length of the agitating member also at least in part defines the size (and at least in part the direction) of the flow path along which liquid or other flowable components in the interior space of the chamber flows past the outer surface of the horn. For example, the horn may have a radius of about 0.875 inches (22.2 mm) and the transverse length of each ring is, as discussed above, about 0.5 inches (12.7 mm). The radius of the inner surface of the housing sidewall is approximately 1.75 inches (44.5 mm) so that the transverse spacing between each ring and the inner surface of the housing sidewall is about 0.375 inches (9.5 mm). It is contemplated that the spacing between the horn outer surface and the inner surface of the chamber sidewall and/or between the agitating members and the inner surface of the chamber sidewall may be greater or less than described above without departing from the scope of this disclosure.

In general, the horn 105 may be constructed of a metal having suitable acoustical and mechanical properties. Examples of suitable metals for construction of the horn 105 include, without limitation, aluminum, monel, titanium, stainless steel, and some alloy steels. It is also contemplated that all or part of the horn 105 may be coated with another metal such as silver, platinum, gold, palladium, lead dioxide, and copper to mention a few. In one particularly suitable embodiment, the agitating members 137 are constructed of the same material as the horn 105, and are more suitably formed integrally with the horn. In other embodiments, one or more of the agitating members 137 may instead be formed separate from the horn 105 and connected thereto.

While the agitating members 137 (e.g., the rings) illustrated in FIG. 1 are relatively flat, i.e., relatively rectangular in cross-section, it is understood that the rings may have a cross-section that is other than rectangular without departing from the scope of this disclosure. The term "cross-section" is used in this instance to refer to a cross-section taken along one transverse direction (e.g., radially in the illustrated embodiment) relative to the horn outer surface 107). Additionally, although the agitating members 137 (e.g., the rings) illustrated in FIG. 1 are constructed only to have a transverse component, it is contemplated that one or more of the agitating members may have at least one longitudinal (e.g., axial) component to take advantage of transverse vibrational displacement of the horn (e.g., at and near the nodal region of the horn illustrated in FIG. 1) during ultrasonic vibration of the waveguide assembly 101.

As best illustrated in FIG. 1, the proximal end of the horn 105 is suitably spaced longitudinally from the inlet port 125 in FIG. 1 to define what is referred to herein as a liquid intake zone in which initial swirling of liquid within the interior space 153 of the chamber housing 151 occurs upstream of the horn 105. This intake zone is particularly useful when removing compounds from the liquid as it may be desirable to use another ingredient (e.g., hydrogen peroxide) that can be pre-mixed with the liquid being treated prior to the liquid coming into contact with the ultrasonic horn of the treatment chamber. More specifically, the additional ingredient, such as hydrogen peroxide, can be used as a strong oxidizing media to allow for better removal of the compounds from the liquid. It is understood, though, that the proximal end of the horn 105 may be nearer to the inlet port 125 than is illustrated in FIG. 1, and may be substantially adjacent to the inlet port so as to generally omit the intake zone, without departing from the scope of this disclosure.

Now referring to FIG. 2A, a baffle assembly, generally indicated at 245 is disposed within the interior space 253 of the chamber 221, and in particular generally transversely adjacent the inner surface 267 of the sidewall 257 and in generally transversely opposed relationship with the horn 205. In one suitable embodiment, the baffle assembly 245 comprises one or more baffle members 247 disposed adjacent the inner surface 267 of the housing sidewall 257 and extending at least in part transversely inward from the inner surface of the sidewall toward the horn 205. More suitably, the one or more baffle members 247 extend transversely inward from the housing sidewall inner surface 267 to a position longitudinally intersticed with the agitating members 237 that extend outward from the outer surface 207 of the horn 205. The term "longitudinally intersticed" is used herein to mean that a longitudinal line drawn parallel to the longitudinal axis of the horn 205 passes through both the agitating members 237 and the baffle members 247. As one example, in the illustrated embodiment the baffle assembly 245 comprises five, generally annular baffle members 247 (i.e., extending continuously about the horn 205) longitudinally intersticed with the six agitating members 237. Likewise in FIGS. 4-6, when the waveguide assembly runs laterally within the housing, the one or more baffle members extend transversely inward from the housing sidewall inner surface to a position laterally intersticed with the agitating members that extend outward from the outer surface of the horn.

As a more particular example, the five annular baffle members 247 illustrated in FIG. 2A are of the same thickness as the agitating members 237 in our previous dimensional example (i.e., 0.125 inches (3.2 mm)) and are spaced longitudinally from each other (e.g., between opposed faces of consecutive baffle members) equal to the longitudinal spacing between the rings (i.e., 0.875 inches (22.2 mm)). Each of the annular baffle members 247 has a transverse length (e.g., inward of the inner surface 267 of the housing sidewall 257) of about 0.5 inches (12.7 mm) so that the innermost edges of the baffle members extend transversely inward beyond the outermost edges of the agitating members 237 (e.g., the rings). It is understood, however, that the baffle members 247 need not extend transversely inward beyond the outermost edges of the agitating members 237 of the horn 205 to remain within the scope of this disclosure.

It will be appreciated that the baffle members 247 thus extend into the flow path of liquid that flows within the interior space 253 of the chamber 221 past the horn 205 (e.g., within the ultrasonic treatment zone). As such, the baffle members 247 inhibit liquid against flowing along the inner surface 267 of the chamber sidewall 257 past the horn 205, and more suitably the baffle members facilitate the flow of liquid transversely inward toward the horn for flowing over the agitating members of the horn (and thereby, flow over the adsorbent, if any) to thereby facilitate removal of compounds using the ultrasonic energy and electric charge present at the outer surface of the horn.

To inhibit gas bubbles against stagnating or otherwise building up along the inner surface 267 of the sidewall 257 and across the face on the underside of each baffle member 247, e.g., as a result of agitation of the liquid, a series of notches (broadly openings) are formed in the outer edge of each of the baffle members (not shown) to facilitate the flow of gas (e.g., gas bubbles) between the outer edges of the baffle members and the inner surface of the chamber sidewall. For example, in one particularly preferred embodiment, four such notches are formed in the outer edge of each of the baffle members in equally spaced relationship with each other. It is understood that openings may be formed in the baffle members other than at the outer edges where the baffle members abut the housing, and remain within the scope of this disclosure. It is also understood, that these notches may number more or less than four, as discussed above, and may even be completely omitted.

It is further contemplated that the baffle members 247 need not be annular or otherwise extend continuously about the horn 205. For example, the baffle members 247 may extend discontinuously about the horn 205, such as in the form of spokes, bumps, segments or other discrete structural formations that extend transversely inward from adjacent the inner surface 267 of the housing sidewall 257. The term "continuously" in reference to the baffle members 247 extending continuously about the horn does not exclude a baffle member as being two or more arcuate segments arranged in end-to-end abutting relationship, i.e., as long as no significant gap is formed between such segments. Suitable baffle member configurations are disclosed in U.S. application Ser. No. 11/530,311 (filed Sep. 8, 2006), which is hereby incorporated by reference to the extent it is consistent herewith.

Also, while the baffle members 247 illustrated in FIG. 2A are each generally flat, e.g., having a generally thin rectangular cross-section, it is contemplated that one or more of the baffle members may each be other than generally flat or rectangular in cross-section to further facilitate the flow of gas bubbles along the interior space 253 of the chamber 221. The term "cross-section" is used in this instance to refer to a cross-section taken along one transverse direction (e.g., radially in the illustrated embodiment, relative to the horn outer surface 207).

Referring back again to FIG. 1, the treatment chamber 121 is further connected to an electrical conducting generator, such as a DC current generator (indicated at 120), for creating an electrical potential within the interior space 153 of the chamber housing 151. As illustrated in FIG. 1, the generator 120 can be connected to the chamber 121 through electrical wires (indicated at 122 and 124) to one or more components of the treatment chamber 121. Specifically, in the illustrated embodiment, electrical wires 122, 124 electrically connect the DC current generator 120 to the terminal end of the horn 105 (e.g., the terminal end 113 of the waveguide assembly 101) and the sidewall 157 of the chamber housing 151, respectively. Depending upon the materials used to form each of the sidewall of the chamber housing and the horn of the waveguide assembly, the electrical current produced creates an electrode potential such that the sidewall of the chamber housing shows properties typical of an anode and the outer surface of the horn shows the properties of a cathode, or vice versa.

Typically, the electrode potential produced by the generator 120 of the present disclosure is in the range of from about 0.1V to about 15V. More suitably, the electrode potential is in the range of from about 0.5V to about 5.0V and, even more suitably, from about 1.0V to about 3.0V. Furthermore, typical current density produced by the electrode potential within the treatment chamber ranges from about 0.1 kA/m$^2$ to about 2 kA/m$^2$ and, more suitably, the current density can be from about 1 kA/m$^2$ to about 1.5 kA/m$^2$.

More specifically, the electrode potential will be determined and produced in an amount required for the desired purpose of treatment chamber. For example, where the treatment chamber is desired for use in removing or electrolyzing a compound from an aqueous effluent or solution, the electrode potential produced will be that which is necessary to electrolyze that particular compound from the solution. For example, when the treatment chamber is designed for use in the electrolysis of ammonia and, more specifically, the removal of nitrogen from a waste aqueous effluent, the electrode potential produced will be that required to electrolyze ammonia to produce nitrogen and hydrogen; that is, the electrode potential will be about 0.77V. Likewise, when the chamber is designed for use in the removal of chlorine from an aqueous potassium chloride solution through electrolysis, the electrode potential produced will be about 0.82V. By way of further example, the electrolysis of water to produce hydrogen and oxygen requires an electrode potential of about 2.06V. It should be understood by one skilled in the art that the examples described above should not be limiting as the electrode potential can be controlled over various ranges and for other additional uses, such as the removal of additional compounds in various other aqueous effluents, without departing from the scope of this disclosure.

Moreover, it should be understood by one skilled in the art, that while the generator 120 is connected to the sidewall 157 and the terminal end 119 of the horn 105 in FIG. 1, the generator can be connected to numerous other areas of the treatment chamber 21 without departing from the scope of this disclosure. Specifically, as illustrated in FIGS. 2A and 3-6 and described more fully below, the electrical wires can connect the generator to multiple waveguide assemblies, each being fully disposed within the interior of the chamber housing of a single treatment chamber. More particularly, as illustrated in FIGS. 2A and 3-6, there are two waveguide assemblies, each having their own corresponding horns, in which the electrical wires connect the generator to each horn at their respective outer surfaces, thereby creating a cathode-like effect at the outer surface of the first horn and an anode-like effect at the outer surface of the second horn. It should be understood that the electrode potential could alternatively electrically charge the outer surface of the first horn as an anode and the outer surface of the second horn as a cathode without departing from the scope of this disclosure.

Referring again to FIG. 1, as there is an electrode potential produced within the interior 153 of the chamber housing 151 by connecting the sidewall 157 of the housing 151 and the outer surface 107 of the horn 105 to a generator 120, it is desirable for the housing 151 to be electrically insulated from the waveguide assembly 101 to maintain the electrode-like effect. As such, in the illustrated embodiment, the housing sidewall 157 is separated from the waveguide assembly 101 (and thus, the horn 105) by at least two insulating members 10 and 12.

Typically, the insulating members 10, 12 can be made using any insulating material known in the art. For example, the insulating members 10, 12 may be produced using any one of a multitude of known inorganic or organic insulating materials. Particularly suitable materials that could be used for the insulating members 10, 12 include solid materials with a high dielectric strength, such as for example, glass, mylar, kapton, ceramic, phenolic glass/epoxy laminates, and the like.

In one embodiment, the treatment chamber further comprises an adsorbent to aid in the removal of compounds from the aqueous effluent. Specifically, the adsorbent is located on the outer surface of the horn and is ultrasonically energized and electrically charged as described above for the outer surface of the horn. Typically, the treatment chamber contains from about 10% (by void volume) to about 90% (by void volume) adsorbent. More suitably, the adsorbent is present in the chamber in an amount of from about 30% (by void volume) to about 70% (by void volume).

Various different adsorbents can be used in the processes of the present disclosure. In one particularly preferred embodiment, the adsorbent is an alumina. Specifically, alumina powder alone or alumina-containing beads/particles may be used, depending upon the desired end use of the treatment chamber. In one embodiment, the alumina is an alumina powder, preferably a Brockmann I activated aluminum oxide powder (also referred to herein as activated alumina).

Activated alumina is manufactured by mild calcinations of aluminum hydroxide (aluminum trihydrate, boehmite), which is an intermediate in the industrial production of aluminum from Bauxite. Specifically, it is precipitated from a sodium aluminate solution. By heating the aluminum hydroxide so obtained at temperatures around 500° C., approximately 33% (by weight) constitutional water is removed, and the crystal structure of the boehmite remains intact.

Aluminas are hydrophilic and have high capacities. As such, activated alumina could suitable capture anionic dyes and surfactants, and chelate with many non-polar dyes.

A full range of standardized aluminas are available with defined activities, pH values, and particle sizes. Activated alumina can be characterized by its Brockmann activity (e.g., activity grades of I, II, III, IV, and V), which is measured using the Brockmann and Schodder test disclosed in Brockmann & Schodder, Ber. Dtsh. Chem. Ges., 74B, 73 (1941). Generally, the activity grade is measured as follows: a standardized volume of a pair of test dyes dissolved in a standard solvent is applied to a standardized column, and after chromatographic development, the activity grade is shown by whether the test dyes separate or not. The test dye pairs that can be used are: (I) azobenzene and p-methoxyazobenzene, (II) p-methoxyazobenzene and Sudan Yellow, (III) Sudan Yellow and Sudan Red, (IV) Sudan Red and p-aminoazobenzene, and (V) p-aminoazobenzene and p-hydroxyazobenzene. Specifically, 20 milligrams of each of the two dyes from the above dye pairs is weighed into 50 milliliters of a solvent mixture containing one part pure benzene and four parts pure petroleum ether (boiling point 50-70° C.) to produce test dye solutions. Ten milliliters of each test dye solution are then applied to the top of a column containing 100-150 millimeters of the adsorbent to be tested. The columns are then eluted with 20 milliliters of eluent, which is the same mixture as used for the solvent above. To determine the activity grade, the migration distance of the test dye in front is measured. The activity grade is then given by the number of the pair of test dyes, in addition to the distance, in millimeters, from the top of the column to the front of the foremost migrated dye. An activated alumina having a Brockmann I Activity is the most reactive.

Brockmann I activated alumina can be converted to grades of lower activity by simply adding water. Specifically, to convert a Brockmann I activated alumina to a Brockmann II activated alumina, 3% (by total weight activated alumina powder) water is added to the Brockmann I activated alumina. To convert the grade I activated alumina to a grade III activated alumina, 6% (by total weight activated alumina powder) water is added, for grade IV, 10% (by total weight activated alumina powder) water is added to the Brockmann I activated alumina, and for grade V, 15% (by total weight activated alumina powder) water is added.

Examples of suitable Brockmann I activated alumina powders are commercially available from CAMAG Scientific Inc. (Wilmington, N.C.) and Sigma-Aldrich (St. Louis, Mo.).

In another embodiment, the alumina can be a particle such as an alumina or silica bead or particle. The types of particles to be used depend upon the aqueous effluent to be treated and the compounds to be removed from the aqueous effluent. For example, in one particular embodiment, the alumina particles are activated alumina particles produced from the activated alumina powder described above.

Another suitable alumina particle is an alumina particle that can contain various other ingredients. In general, the particle can contain any material that does not adversely interfere with the ability of the compounds, which are to be removed from the aqueous effluent, to bond to alumina. In this regard, at least a portion of the alumina contained by the particle should be present on the surface of the particle so that the alumina is available for adsorbing the compounds.

For example, in one embodiment, the alumina particles for use in the treatment chamber are alumina sol particles. Alumina sols are colloidal hydrous alumina that can maintain a wide range of viscosities and are highly heat resistant. Many different types of alumina sols are commercially available with varying particle sizes. Of particular advantage, alumina sols can be prepared that carry a relatively strong positive surface charge or zeta potential. In this embodiment, the particle that is reacted with the compounds contains primarily, and in some embodiments, exclusively alumina. Examples of alumina particle materials include Aluminasol-100 and Aluminasol-200, which are both commercially available from Nissan Chemical America (Houston, Tex.).

In another embodiment, the particle can contain a core material coated with alumina. The alumina can form a continuous or a discontinuous coating over the particle. The core material can be, for instance, an inorganic oxide, such as silica. For example, in one embodiment, sols can be used that contain silica nanoparticles that have an alumina surface coating. Such sols are commercially available from Nissan Chemical America (Houston, Tex.). The silica is coated with alumina to provide stability to the sols over certain pH ranges. In fact, alumina coated silica sols may have greater stability in some applications of the present disclosure in comparison to alumina sols. Specific examples of alumina coated particles with silica cores include SNOWTEX-AK®, available from Nissan Chemical America (Houston, Tex.) and Ludox Cl®, available from Grace Davison (Columbia, Md.).

When the alumina is in particle form, the particles have an average particle size of from about 5 nanometers to less than 500 microns. More suitably, the alumina particles have an average particle size of from about 10 nanometers to less than 1 micron, and even more suitably, from about 15 nanometers to about 25 nanometers.

Other adsorbent materials are also suitable for use in the present disclosure. Examples include activated carbon, zeolites, and silica. Silica functions similar to the activated alumina described above.

Activated carbon is hydrophobic in nature and generally favors organic materials. It is typically used to remove organic pollutants from aqueous effluents. Activated carbon can suitably adsorb non-polar compounds such as dyes and pigments in aqueous effluents.

Generally, zeolites are hydrated alumino-silicate minerals with porous structures. They are hydrophilic with polar, regular channels, and are typically used in air separation and dehydration. Zeolites could suitably remove compounds such as acid dyes, reactive dyes, surfactants, and the like from aqueous effluents.

Without being bound to a particular theory, it is believed that using an energized and electrically charged adsorbent provides for improved adsorption of the compounds to be removed from the aqueous effluent onto the surface of the adsorbent. Generally, it has been found that an adsorbent that has been ultrasonically energized and electrically charged using an electric current source can more efficiently and more effectively bind to compounds, allowing for an improved removal of these compounds from aqueous effluent. Specifically, by subjecting the adsorbent in the treatment chamber to ultrasonic energy and an electrode potential, microcavitation within the aqueous effluent will occur. As the small bubbles produced through microcavitation collapse or oscillate, microconvective currents are produced, which result in a flow of fluid in an otherwise stagnant zone. Additionally, the acoustic wave produced by the ultrasonic energy produces a pulsed bulk motion that further provides for fluid agitation. The increased fluid flow produced by both the microcavitation and the acoustic wave results in reducing the thickness of the hydrodynamic boundary layer that surrounds the adsorbent. This effect allows for improved mass transport of the compounds in the aqueous effluent to the surface of the adsorbent, allowing for a quicker, more effective adsorption. Furthermore, by creating an electrode potential within the treatment chamber, the adsorbent can become more or less positively charged depending upon the desired compounds for removal from the aqueous effluent. For example, when a more negatively charged compound for removal is desired, an electrode potential can be produced within the treatment chamber which will allow for the positively charged adsorbent to attract to the cathode (e.g., negatively charged), thereby more positively charging the adsorbent (e.g., adsorbent as an anode), which will cause a stronger attraction and binding between the more positive adsorbent and the negative compound. Similarly, when the compound to be removed has a positive charge (i.e., $H^+$ ions), an electrode potential can be created to more negatively charge the adsorbent. The negatively-charged adsorbent will be attracted to the anode (i.e., positively charged), which will further enhance the negative charge on the adsorbent and result in greater adsorption affinity to the positively charged compound for removal.

In one embodiment, the aqueous effluent is textile effluent resulting from textile dyeing and printing processes. Specifically, the textile effluent contains the fraction of the applied colorant that will not bind to the substrate being dyed. These unbound colorants are typically removed by a water rinsing process, generating large quantities of textile effluent that must be disposed of in an environmentally acceptable manner.

Compounds to be removed from the textile effluent in the above embodiment can include, for example, dyes, tannins, optical brighteners, sizing agents, enzymes, bleaching agents, surfactants, salts, lubricants, fire retardants, plasticizers, monomers such as acrylics, methacrylics, acrylonitriles, initiators, acids such as acetic, asorbic, citric, malic, and formic acids, alkali such as sodium carbonate, UV absorbers, and combinations thereof.

In another embodiment, the aqueous effluent is a beverage, such as fruit juices, wine, and beer. For example, in one embodiment, the beverage is wine. When making wine, compounds such as yeast cells, particles of grape skins, tartrates, proteins, tannins, and other suspended solids must be removed to produce a product that is sterile, visually clear, less bitter, and shelf-stable. Similarly, when the beverage is beer, compounds such as yeast, protein/polyphenol complexes, and other insoluble material must be removed. Moreover, microorganisms and byproducts of fruit spoilage, such as mycotoxins produced by mold, must be removed from fruit juices and wine. Additionally, fruits such as oranges and grapefruits have bitter compounds including limonin, hesperidin, and polyphenols, which must be removed from the juice during processing.

Additionally, in accordance with the present disclosure, the aqueous effluent can be water. Specifically, in one embodiment, the aqueous effluent is drinking water. For example, many homes, businesses and communities rely on underground water for their fresh drinking water. By drilling wells to various depths, this underground water, which is in underground aquifers, is trapped and used. Many times, this underground water contains measurable levels of organics that, for health reasons, are considered unusable for human consumption. Examples of hazardous organic compounds include arsenic and fluoride. Other organics can include organic chemicals such as herbicides, pesticides, fertilizers, and the like that have been deposed of by depositing them in landfills or by letting them seep into the ground and air from waste lagoons. Under some circumstances, gasoline has entered into the ground water from corroded underground storage tanks. Furthermore, many types of microorganisms, such as bacteria, can grow in underground water. Additionally, similar to the beverages above, proteins and other insoluble material that produce a cloudy appearance should be removed to produce acceptable drinking water. Examples of other insoluble material include high levels of humic substances, which are organic molecules created by microbial degradation of plant and animal matter. Their brown color is aesthetically unpleasing to the consumer and the substances can further react with oxidizing agents in treatment processes such as chlorine or ozone to produce disinfection by-products (DBPs).

The aqueous effluent, in another embodiment, can be a body of water such as a river, lake, or stream that has become contaminated and must be treated to meet government environmental laws. Such bodies of water typically contain one or more impurities such as suspended solids, dissolved organic matter, microorganisms, dissolved mineral matter, and the like.

While the present disclosure describes using an energized adsorbent to remove compounds from an aqueous effluent, non-aqueous filtrations can also be conducted using the adsorbent and treatment chamber of the present disclosure.

As further noted above, in some embodiments, the treatment chamber can include more than one waveguide assembly having at least two horn assemblies for ultrasonic treatment and electric charging. Referring to FIG. 2A, the treatment chamber 221 comprises a housing 251 defining an interior space 253 of the chamber 221 through which liquid is delivered from two laterally opposing inlet ends 269 and 279. The housing 251 comprises an elongate tube 255 defining, at least in part, a sidewall 257 of the chamber 221. The tube 255 has two inlet ports 240 and 245 formed therein and being laterally opposed to one another through which one or more aqueous effluents having compounds to be removed within the chamber 221 are delivered to the interior space 253 thereof, and at least one outlet port 265 through which the liquid (i.e., aqueous effluent), once treated, exits the chamber 221.

Two waveguide assemblies 201 and 203 extend longitudinally at least in part within the interior space 253 of the chamber 221 to ultrasonically energize the outer surfaces of the first ultrasonic horn 205 and second ultrasonic horn 209 located on each waveguide assembly 201 and 203 within the interior space 253 of the chamber 221. Both the first ultrasonic horn 205 and the second ultrasonic horn 209 are disposed entirely within the interior space 253 of the housing 251 intermediate the inlet ports 269 and 279 and the outlet port 265 for complete submersion within the liquid within the chamber 221. Each horn assembly 233 and 225 can be independently constructed as described (including the horns 205 and 209, along with the plurality of agitating members 237 and 239 and baffle assemblies 245 and 249) for the single horn assembly configuration of FIG. 1 above.

Figure 2B:
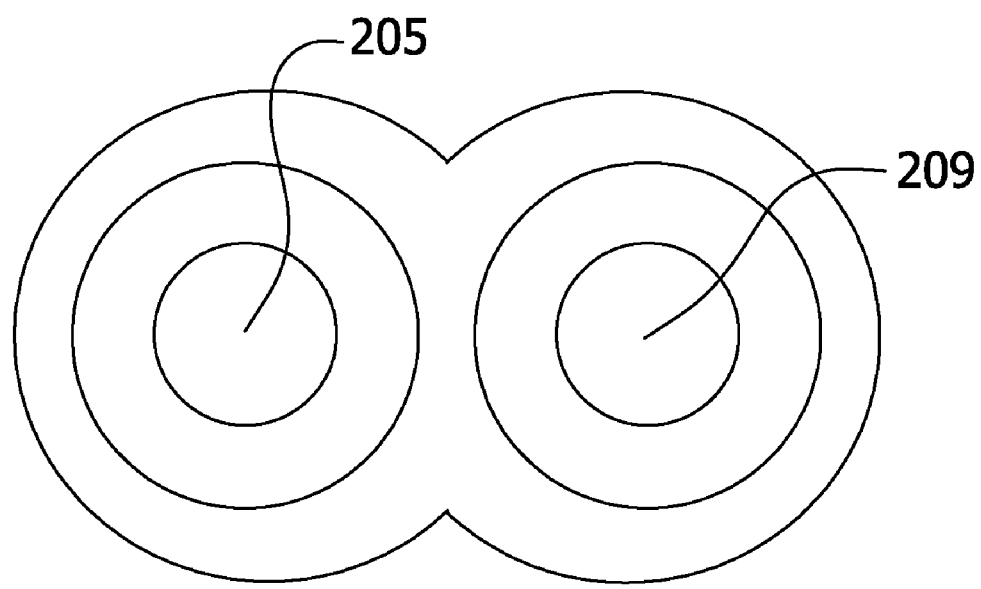
FIG. 2B is a top plan view of the treatment chamber of FIG. 2A.

Still referring to FIG. 2A, a generator (not shown) can be electrically connected to the outside surfaces 207 and 211 of horns 205 and 209, respectively, of the two horn assemblies 233 and 225 to create an electrode potential within the interior 253 of the housing 251 of the chamber 221. As illustrated in FIG. 2A, the outer surface 211 of the second horn 209 (and any adsorbent located thereon (not shown)) is electrically charged as an anode, while the outer surface 207 of the first horn 205 (and any adsorbent located thereon (not shown)) is electrically charged as a cathode (see also FIG. 2B, illustrating the terminal end of the first horn 205 as a cathode and the terminal end of the second horn 209 as an anode). It should be understood that the outer surface of the first horn 205 (and any adsorbent located thereon (not shown)) could alternatively act as the anode and the outer surface of the second horn 209 (and any adsorbent located thereon (not shown)) could act as the cathode without departing from the scope of this disclosure. Furthermore, as with the treatment chamber of FIG. 1, the housing 251 is separated from the first waveguide assembly 201 using at least a first insulating member 210 and at least a second insulating member 212 and from the second waveguide assembly 203 using at least a third insulating member 214 and at least a fourth insulating member 216.

Figure 3:
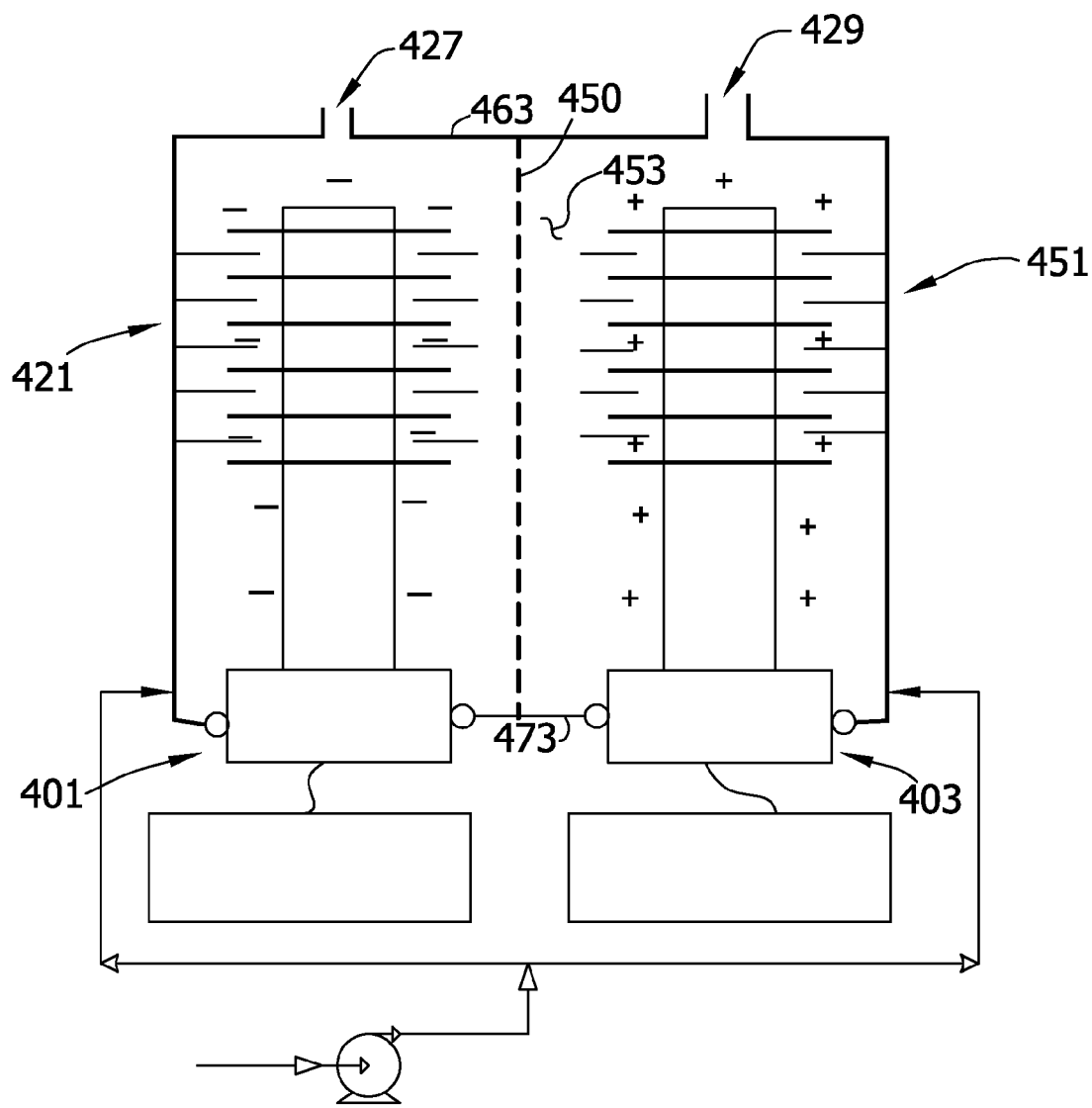
FIG. 3 a schematic of a treatment chamber used in a process according to a third embodiment of the present disclosure for ultrasonically treating and electrically charging an ultrasonic horn for removing compounds in an aqueous effluent.

Now referring to FIG. 3, the treatment chamber 421 is similar to the treatment chamber 221 of FIG. 2A in that the chamber 421 contains two separate waveguide assemblies 401 and 403. The waveguide assemblies 401, 403 of FIG. 3, however, are further separated within the interior space 453 of the housing 451 by a mesh substrate 450 that runs laterally between the first waveguide assembly 401 and the second waveguide assembly 403. More particularly, the mesh substrate 450 extends from the upper longitudinal end (e.g., first longitudinal end) of the housing, generally indicated at 463 (e.g., corresponding to closure 263 of FIG. 2A) to the lower longitudinal end (e.g., second longitudinal end) of the housing, generally indicated at 473. The mesh substrate is generally capable of separating gases being generated as compounds are electrolyzed from the liquid. For example, in the electrolysis of ammonia, nitrogen gas is formed at the anode and hydrogen gas is formed at the cathode. It is desirable to keep these gases separate for later resale purposes.

Furthermore, the mesh substrate can be used to allow formed ions to migrate across the treatment chamber from the anode to the cathode so as to keep ionic neutrality in the entire liquid. For example, the electrolysis of water forms hydrogen gas and oxygen gas. At the anode, oxygen gas is formed along with the hydrogen ion ($H^+$) and, at the cathode, hydrogen gas is formed along with the hydroxyl ion ($OH^-$). Both the hydrogen and hydroxyl ions can migrate across this mesh substrate so as to maintain ionic neutrality within the interior of the treatment chamber.

Typically, the mesh substrate can be made of any suitable material known in the art. For example, one particular material for the mesh substrate is stainless steel. Further examples include, mesh substrates made from polyethylene, polypropylene, and perfluorinated materials. Suitably, the mesh substrate has a pore size of from about 15 microns to about 450 microns and, more suitably, from about 20 microns to about 100 microns. The mesh substrate typically has a thickness of from about 0.001 inches to a bout 0.05 inches and, more suitably, from about 0.005 inches to about 0.04 inches.

As the treatment chamber 421 is divided into two compartments by the mesh substrate 450, it is suitable for the housing 451 to include more than one outlet port. Specifically, in the illustrated embodiment, there are two outlet ports 427 and 429. More specifically, the first outlet port 427 allows liquid that has had compounds removed by the energizing and charging of the first horn to exit the interior space 453 of the chamber housing 451, and the second outlet port 429 allows liquid that has had compounds removed by the energizing and charging of the second horn to exit the interior space 453 of the chamber housing 451. It should be understood by one skilled in the art that, while FIG. 3A depicts two outlet ports, the housing 451 of the treatment chamber 421 may include more than two outlet ports, or alternatively only one outlet port, without departing from the scope of this disclosure.

Referring now to FIG. 4, the treatment chamber 521 is generally elongate, however in contrast to FIGS. 1-3, the treatment chamber 521 is configured such that fluid enters the chamber 521 at the inlet end 535 thereof, flows generally laterally within the chamber (e.g., toward the right in the orientation of illustrated embodiment) and exits the chamber 521 generally at the outlet end 527 of the chamber 521. The treatment chamber 521 comprises a housing 551 defining an interior space 553 of the chamber 521 through which liquid is delivered from at least one inlet port 569. The housing 551 comprises an elongate tube 555 defining, at least in part, a sidewall 557 of the chamber 521. The housing 551 has two longitudinally opposing ends through which one or more aqueous effluents having compounds to be removed within the chamber 521 are delivered to the interior space 553 thereof, and at least one outlet port 565 through which the liquid, once the compounds have been removed, exits the chamber 521.

Two waveguide assemblies 501 and 503 extend laterally at least in part within the interior space 553 of the chamber 521. Each waveguide assembly 501 and 503 separately includes an elongate horn assembly, generally indicated at 533 and 535, respectively, to be ultrasonically energized and electrically charged to remove compounds from the aqueous effluent. Each horn is disposed entirely within the interior space 553 of the housing 551 intermediate the inlet port 569 and the outlet port 565 for complete submersion within the liquid within the chamber 521. In the illustrated embodiment, the terminal ends 573 and 575 of horn assemblies 533 and 535, respectively, directly face towards each other. Each horn assembly 533 and 535 can be independently constructed as described (including the horns 505 and 509, along with the plurality of agitating members 537 and 539 and baffle assemblies (not shown)) for the single horn assembly configuration of FIG. 1 above.

Still referring to FIG. 4, an electric DC current generator (not shown) can be electrically connected to the outside surfaces 507 and 511 of horns 505 and 509, respectively, of the two horn assemblies 533 and 535 to create an electrode potential within the interior space 553 of the housing 551 of the chamber 521. As illustrated in FIG. 4, the outer surface 511 of the second horn 509 (and any adsorbent located thereon (not shown)) is electrically charged as an anode, while the outer surface 507 of the first horn 505 (and any adsorbent located thereon (not shown)) is electrically charged as a cathode. It should be understood that the outer surface of the first horn 505 (and any adsorbent located thereon (not shown)) could be alternatively electrically charged as the anode and the outer surface of the second horn 509 (and any adsorbent located thereon (not shown)) could be charged as the cathode without departing from the scope of this disclosure. Furthermore, as with the treatment chamber of FIGS. 1 and 2A, the housing 551 is separated from the first waveguide assembly 501 using at least a first insulating member 510 and at least a second insulating member 512 and from the second waveguide assembly 503 using at least a third insulating member 514 and at least a fourth insulating member 516.

As illustrated in FIG. 5, in some embodiments in which two or more waveguide assemblies 601 and 603 extend laterally at least in part within the interior space 653 of the chamber 621, the terminal ends 673 and 675 of waveguide assemblies 601 and 603, respectively, face away from each other.

In the illustrated embodiment, the waveguide assemblies 633 and 635 are separated within the interior space 653 of the housing 651 by a mesh substrate 650, similar to the mesh substrate of FIG. 3, that runs laterally between the first waveguide assembly 601 and the second waveguide assembly 603. More particularly, the mesh substrate 650 extends from the upper longitudinal end (e.g., first longitudinal end) of the housing, generally indicated at 663 (e.g., corresponding to closure 263 of FIG. 2A) to the lower longitudinal end (e.g., second longitudinal end) of the housing, generally indicated at 678. In this embodiment, the mesh substrate 650 provides structural support to the first waveguide assembly 601 and second waveguide assembly 603, and more particularly, is constructed to substantially vibrationally isolate the first waveguide assembly 601 and second waveguide assembly 603 within the interior space 653 from the chamber housing 651.

Like the waveguide assembly of FIG. 1 described above, the first waveguide assembly 601 and the second waveguide assembly 603 can suitably be mounted on the mesh substrate 650 by a mounting member (not shown). The mounting member used as described above for the illustrated embodiment of FIG. 1 can be used as the mounting member in this embodiment.

As the treatment chamber 621 is divided into two compartments by the mesh substrate 650, it is suitable for the housing 651 to include more than one inlet port (as illustrated, the housing includes a first inlet port, generally indicated at 669, and a second inlet port, generally indicated at 679) and more than one outlet port (as illustrated, the housing includes a first outlet port, generally indicated at 627, and a second outlet port, generally indicated at 629). More specifically, the first inlet port 669 allows one or more liquid solutions having compounds to be removed to enter into the interior space 653 of the chamber housing 651 and then the first outlet port 627 allows liquid that has had compounds removed by the energizing and charging of the first horn to exit the interior space 653 of the chamber housing 651, and the second inlet port 679 allows one or more liquid solutions having compounds to be removed to enter into the interior space 653 of the chamber housing 651 and then the second outlet port 629 allows liquid that has had compounds removed by the energizing and charging of the second horn to exit the interior space 653 of the chamber housing 651.

In yet another alternate configuration, as illustrated in FIG. 6, the treatment chamber 721 is generally elongate and configured such that fluid enters the chamber 721 at the inlet end 759 thereof, flows generally laterally within the chamber (e.g., toward the left in the orientation of illustrated embodiment) and exits the chamber 721 generally at the outlet end 727 of the chamber 721. The treatment chamber 721 comprises a housing 751 defining an interior space 753 of the chamber 721 through which liquid is delivered from at least one inlet port 769. The housing 751 comprises an elongate tube 755 defining, at least in part, a sidewall 757 of the chamber 721. The housing 751 has two longitudinally opposing ends through which one or more liquid solutions having compounds to be removed within the chamber 721 are delivered to the interior space 753 thereof, and at least one outlet port 765 through which the liquid exits the chamber 721.

Two waveguide assemblies 701 and 703 extend laterally at least in part within the interior space 753 of the chamber 721. Each waveguide assembly 701 and 703 separately includes an elongate horn assembly, generally indicated at 733 and 735, respectively, to be ultrasonically energized and electrically charged to remove compounds from the aqueous effluent. Each horn is disposed entirely within the interior space 753 of the housing 751 intermediate the inlet port 769 and the outlet port 765 for complete submersion within the liquid within the chamber 721. In the illustrated embodiment, the second horn, indicated generally at 709, of second horn assembly 735 of the second waveguide assembly 703 is configured in a hollow cylinder shape. The first horn member, indicated at 715, of the first horn assembly 733 of the first waveguide assembly 701 is disposed lengthwise within the hollow cylinder shaped second horn 709.

In an alternative embodiment (not shown), the second horn can be configured in a U-shape and can include two arm members. The first horn member is disposed between the first arm member and the second arm member of the second horn. When the first horn and the second horn members each comprise agitating members as described above, this configuration can allow for better overlap of the agitating members, producing increased cavitation.

In either of the above two embodiments, each horn assembly 733 and 735 can further include the plurality of agitating members 737 and 739, respectively, and baffle assemblies (not shown) as with the single horn assembly configuration of FIG. 1 above.

Figure 8:
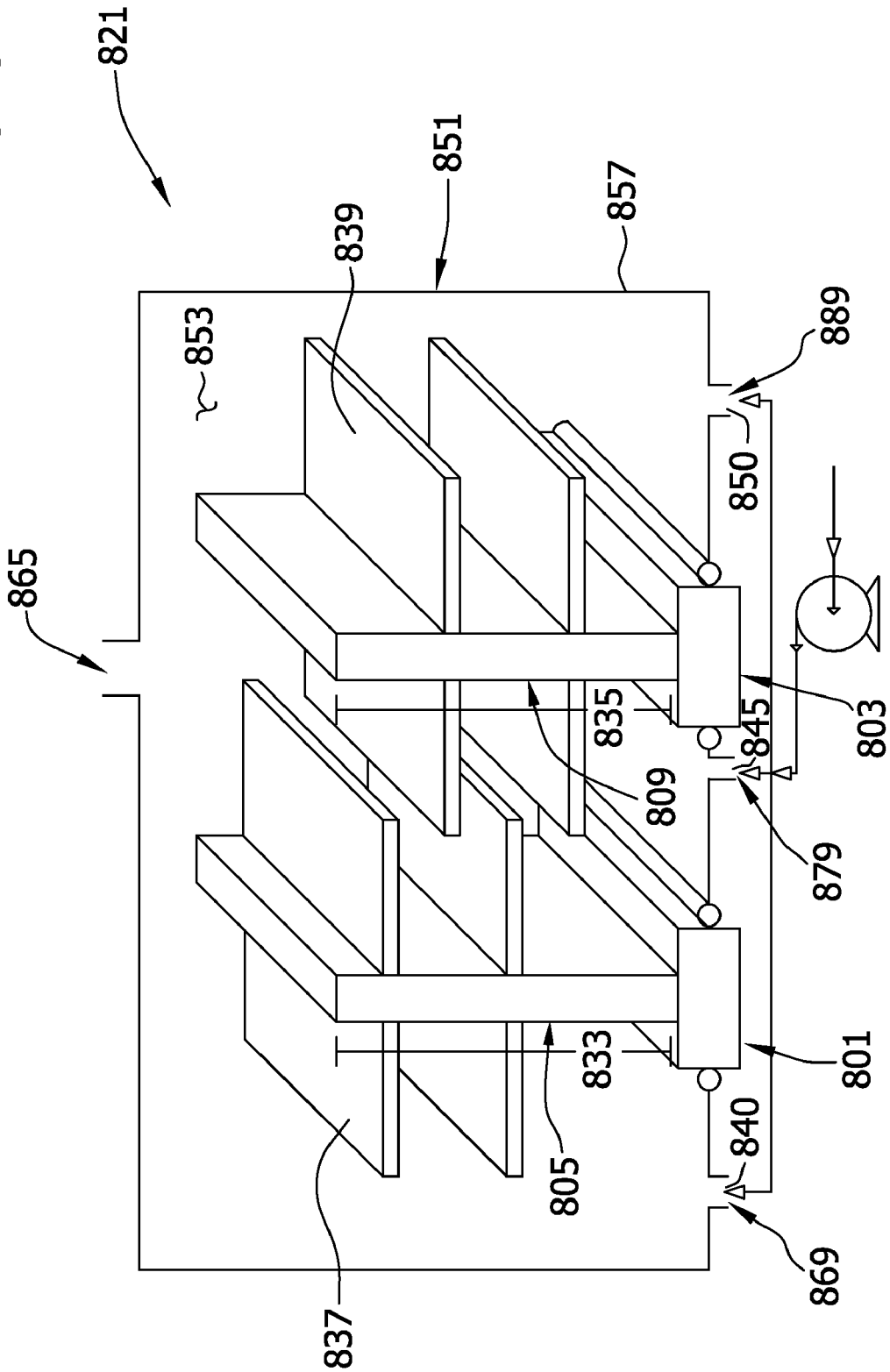
FIG. 8 is a schematic of a treatment chamber used in a process according to an eighth embodiment of the present disclosure for ultrasonically treating and electrically charging an ultrasonic horn for removing compounds in an aqueous effluent.

Now referring to FIG. 8, the treatment chamber 821 comprises a housing 851 defining an interior space 853 of the chamber 821 through which liquid is delivered from three laterally aligned inlet ends 869, 879 and 889. The housing 851 comprises an elongate tube defining, at least in part, a sidewall 857 of the chamber 821. The tube has three inlet ports 840, 845 and 850 formed therein and being laterally aligned to one another through which one or more liquid solutions or components to be treated within the chamber 821 are delivered to the interior space 853 thereof, and at least one outlet port 865 through which the liquid, once treated, exits the chamber 821.

Two waveguide assemblies 801 and 803 extend longitudinally at least in part within the interior space 853 of the chamber 821 to ultrasonically energize liquid flowing through the interior space 853 of the chamber 821. Each waveguide assembly 801 and 803 separately includes a plate-like elongate horn assembly, generally indicated at 833 and 835, respectively, each disposed entirely within the interior space 853 of the housing 851 intermediate the inlet ports 869, 879 and 889 and the outlet port 865 for complete submersion within the liquid being treated within the chamber 821. Each horn assembly 833 and 835 can be independently constructed as described (including the horns 805 and 809, along with the plurality of agitating members 837 and 839 and baffle assemblies (not shown)) for the single horn assembly configuration of FIG. 1 above. In this configuration, the agitating members 837 and 839, when present, are flat disk-like pieces that surround the outer surface of the plate-like horn members.

Furthermore, in the treatment chamber illustrated in FIG. 8, a generator (not shown) can be electrically connected to the outside surfaces of horns 805 and 809 as discussed of the treatment chamber in FIG. 2A above.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the disclosure, it is intended that all matter contained in the above description and shown in the accompanying drawings shall be interpreted as illustrative and not in a limiting sense.

What is claimed is:

1. A process for removing compounds from an aqueous effluent, the process comprising:
   introducing the aqueous effluent through at least one inlet port of an elongate housing of a treatment chamber, the housing comprising longitudinally opposite ends and an interior space, the housing further being generally closed at at least one longitudinal end;
   ultrasonically energizing and electrically charging an outer surface of an elongate ultrasonic horn of an elongate ultrasonic waveguide assembly located within the housing at a predetermined ultrasonic frequency and electrode potential to remove compounds from the aqueous effluent; and
   exhausting the cleaned aqueous effluent from at least one outlet port of the housing.

2. The process as set forth in claim 1 wherein the ultrasonic horn is disposed at least in part intermediate the inlet port and the outlet port of the housing and has an outer surface located for contact with the aqueous effluent flowing within the housing from the inlet port to the outlet port.

3. The process as set forth in claim 2 wherein the electrode potential is produced by electrically contacting both the housing and the outer surface of the ultrasonic horn with an electrical current source.

4. The process as set forth in claim 3 wherein the electrode potential produced is in the range of 0.1V to about 15V.

5. The process as set forth in claim 2 wherein the ultrasonic horn further comprises a plurality of discrete agitating members in contact with and extending transversely outward from the outer surface of the horn intermediate the inlet port and the outlet port of the housing in longitudinally spaced relationship with each other, the agitating members and the ultrasonic horn being constructed and arranged for dynamic motion of the agitating members relative to the ultrasonic horn upon ultrasonic vibration of the ultrasonic horn at the predetermined frequency and to operate in an ultrasonic cavitation mode of the agitating members corresponding to the predetermined frequency and the aqueous effluent being treated in the chamber.

6. The process as set forth in claim 5 wherein at least one of the agitating members comprises a T-shape.

7. The process as set forth in claim 2 wherein the housing further comprises an adsorbent located on the outer surface of the ultrasonic horn, wherein the process further comprises ultrasonically energizing and electrically charging the adsorbent at the predetermined ultrasonic frequency and electrode potential to remove compounds from the aqueous effluent.

8. A process for removing compounds from an aqueous effluent, the process comprising:
   introducing the aqueous effluent through at least one inlet port of an elongate housing of a treatment chamber, the housing comprising longitudinally opposite ends and an interior space, the housing further being generally closed at at least one longitudinal end;
   ultrasonically energizing and electrically charging an outer surface of a first longitudinally elongate ultrasonic horn of a first longitudinally elongate ultrasonic waveguide assembly located within the housing at a first predetermined ultrasonic frequency and an electrode potential and ultrasonically energizing and electrically charging an outer surface of a second longitudinally elongate ultrasonic horn of a second longitudinally elongate ultrasonic waveguide assembly located within the housing at a second predetermined ultrasonic frequency and the electrode potential to remove compounds from the aqueous effluent, wherein the first waveguide assembly and the second waveguide assembly are oriented in parallel within the housing; and
   exhausting the cleaned aqueous effluent from at least one outlet port of the housing.

9. The process as set forth in claim 8 wherein the first ultrasonic horn and the second ultrasonic horn are independently disposed at least in part intermediate the inlet port and the outlet port of the housing and wherein the outer surfaces of each are independently located for contact with the aqueous effluent flowing within the housing from the inlet port to the outlet port.

10. The process as set forth in claim 9 wherein the electrode potential is produced by electrically contacting both the outer surface of the first ultrasonic horn and the outer surface of the second ultrasonic horn with an electrical current source.

11. The process as set forth in claim 9 wherein the housing comprises a first longitudinal end and a second longitudinal end, and wherein the treatment chamber further comprises a mesh substrate located laterally between the first waveguide assembly and the second waveguide assembly and extending from the first longitudinal end of the housing to the second longitudinal end of the housing.

12. The process as set forth in claim 9 wherein the housing further comprises an adsorbent located on at least one of the outer surface of the first ultrasonic horn and the outer surface of the second ultrasonic horn, wherein the process further comprises ultrasonically energizing and electrically charged the adsorbent at least one of the first predetermined ultrasonic frequency and the second predetermined ultrasonic frequency and the electrode potential to remove compounds from the aqueous effluent.

13. A process for removing compounds from an aqueous effluent, the process comprising:
   introducing the aqueous effluent through at least one inlet port of an elongate housing of a treatment chamber, the housing comprising longitudinally opposite ends and an interior space, the housing further being generally closed at at least one longitudinal end;
   ultrasonically energizing and electrically charging an outer surface of a first elongate ultrasonic horn of a first elongate ultrasonic waveguide assembly located within the housing at a first predetermined ultrasonic frequency and an electrode potential and ultrasonically energizing and electrically charging an outer surface of a second elongate ultrasonic horn of a second elongate ultrasonic waveguide assembly located within the housing at a second predetermined ultrasonic frequency and an electrode potential to remove compounds from the aqueous effluent, wherein both the first waveguide assembly and the second waveguide assembly independently comprise terminal ends, wherein the terminal end of the first waveguide assembly faces towards the terminal end of the second waveguide assembly; and exhausting the cleaned aqueous effluent from at least one outlet port of the housing.

14. The process as set forth in claim 13 wherein the first ultrasonic horn and the second ultrasonic horn are independently disposed at least in part intermediate the inlet port and the outlet port of the housing and wherein the outer surfaces of each are independently located for contact with the aqueous effluent flowing within the housing from the inlet port to the outlet port.

15. The process as set forth in claim 14 wherein the electrode potential is produced by electrically contacting both the outer surface of the first ultrasonic horn and the outer surface of the second ultrasonic horn with an electrical current source.

16. The process as set forth in claim 14 wherein the housing has a first longitudinal end and a second longitudinal end and, wherein the treatment chamber further comprises a mesh substrate located laterally between the first waveguide assembly and the second waveguide assembly and extending from the first longitudinal end of the housing to the second longitudinal end of the housing.

17. The process as set forth in claim 14 wherein the second ultrasonic horn further is U-shaped and thereby comprises a first arm member and a second arm member, and wherein the first ultrasonic horn is disposed between the first arm member and second arm member of the second ultrasonic horn.

18. The process as set forth in claim 14 wherein the second ultrasonic horn further is configured in a hollow cylinder shape, and wherein the first ultrasonic horn is disposed lengthwise within the cylinder of the second ultrasonic horn.

19. The process as set forth in claim 18 wherein electrode potential is produced by electrically contacting both the outer surface of the first ultrasonic horn and the outer surface of the second ultrasonic horn with an electrical current source.

20. A process for removing compounds from an aqueous effluent, the process comprising:

introducing the aqueous effluent through at least one inlet port of an elongate housing of a treatment chamber, the housing comprising longitudinally opposite ends and an interior space, the housing further being generally closed at at least one longitudinal end;

ultrasonically energizing and electrically charging an outer surface of a first elongate ultrasonic horn of a first elongate ultrasonic waveguide assembly located within the housing at a first predetermined ultrasonic frequency and an electrode potential and ultrasonically energizing and electrically charging an outer surface of a second elongate ultrasonic horn of a second elongate ultrasonic waveguide assembly located within the housing at a second predetermined ultrasonic frequency and an electrode potential to remove compounds from the aqueous effluent, wherein both the first waveguide assembly and the second waveguide assembly independently comprise terminal ends, wherein the terminal end of the first waveguide assembly faces away from the terminal end of the second waveguide assembly; and exhausting the cleaned aqueous effluent from at least one outlet port of the housing.

* * * * *